United States Patent
Taylor et al.

(10) Patent No.: US 7,557,965 B2
(45) Date of Patent: Jul. 7, 2009

(54) AUTOMATED PAGE TURNING APPARATUS TO ASSIST IN VIEWING PAGES OF A DOCUMENT

(75) Inventors: Thomas N. Taylor, Rochester, NY (US); Lotfi Belkhir, Victor, NY (US)

(73) Assignee: Kirtas Technologies, Inc., Victor, NY (US)

( * ) Notice: Subject to any disclaimer, the term of this patent is extended or adjusted under 35 U.S.C. 154(b) by 1139 days.

(21) Appl. No.: 10/658,956

(22) Filed: Sep. 10, 2003

(65) Prior Publication Data

US 2004/0047009 A1    Mar. 11, 2004

Related U.S. Application Data

(60) Provisional application No. 60/409,399, filed on Sep. 10, 2002.

(51) Int. Cl.
*H04N 1/04* (2006.01)
*H04N 1/00* (2006.01)
(52) U.S. Cl. .............. 358/474; 358/498; 358/497; 358/400
(58) Field of Classification Search ........ 358/498, 358/474, 497, 400, 501, 1.1, 401, 493, 492, 358/1.18; 355/25; 399/362; 283/63.1; 101/93
See application file for complete search history.

(56) References Cited

U.S. PATENT DOCUMENTS

| | | | |
|---|---|---|---|
| 2,065,011 A | 12/1936 | McDowell | |
| 2,555,186 A | 5/1951 | Demers | |
| 3,016,036 A | 1/1962 | Jorgensen | |
| 3,484,970 A | 12/1969 | Berlinsky et al. | |
| 3,550,296 A | 12/1970 | Castagna | |
| 3,800,453 A | 4/1974 | Kroes | |

(Continued)

FOREIGN PATENT DOCUMENTS

DE    242884    1/1912

(Continued)

OTHER PUBLICATIONS

US Prosecution History for co-pending U.S. Appl. No. 10/389,051 as listed in Public PAIR on Sep. 23, 2008 Co-pending application published on Sep. 18, 2003 as US 2003-0172795 A1, Belkhir.

(Continued)

*Primary Examiner*—Dov Popovici
(74) *Attorney, Agent, or Firm*—Duane C. Basch; Basch & Nickerson LLP

(57) ABSTRACT

The present invention is a method and apparatus for the viewing and acquisition of images of a document such as a book. The apparatus allows for the automated and reliable turning of pages of the document, while supporting it in a manner to facilitate imaging of the facing pages. In one embodiment, the apparatus includes a base for supporting the operative assemblies and components of the apparatus, a cradle assembly for holding a book, and a page turning assembly for presenting the pages to be imaged in seriatim. The method employed by the present invention involves the steps of turning pages, clamping pages and imaging, wherein the various components of the apparatus are operated to carry out the page turning and imaging functions in sequence.

37 Claims, 22 Drawing Sheets

U.S. PATENT DOCUMENTS

| | | | |
|---|---|---|---|
| 3,816,646 A | 6/1974 | Cinque | |
| 3,939,587 A | 2/1976 | Weststrom | |
| 4,102,071 A | 7/1978 | D'Arcy | |
| 4,121,361 A | 10/1978 | D'Arcy | |
| 4,346,641 A | 8/1982 | Kobayashi | |
| 4,432,154 A | 2/1984 | D'Arcy | |
| 4,488,367 A | 12/1984 | Yamauchi et al. | |
| 4,545,141 A | 10/1985 | Ito et al. | |
| 4,566,683 A | 1/1986 | Moore | |
| 4,644,675 A | 2/1987 | Berger et al. | |
| 4,663,873 A | 5/1987 | Shinbrot et al. | |
| 4,673,286 A | 6/1987 | Shinbrot | |
| 4,831,457 A | 5/1989 | Watanabe et al. | |
| 4,899,214 A | 2/1990 | Robbins et al. | |
| 4,916,839 A | 4/1990 | Nakanishi | |
| 4,942,482 A | 7/1990 | Kakinuma et al. | |
| 5,247,755 A | 9/1993 | Sato et al. | |
| 5,325,213 A | 6/1994 | Takahashi et al. | |
| 5,351,927 A | 10/1994 | Howell | |
| 5,359,207 A | 10/1994 | Turner | |
| 5,390,033 A | 2/1995 | Bannai et al. | |
| 5,471,277 A | 11/1995 | Fujioka et al. | |
| 5,493,943 A | 2/1996 | Horikawa | |
| 5,610,720 A * | 3/1997 | Fujioka et al. | 358/296 |
| 5,612,791 A * | 3/1997 | Turner et al. | 358/497 |
| 5,640,252 A | 6/1997 | Turner et al. | |
| 5,777,660 A | 7/1998 | Ard | |
| 5,967,507 A | 10/1999 | Moore et al. | |
| 5,979,940 A | 11/1999 | Araghi et al. | |
| 6,011,635 A | 1/2000 | Bungo et al. | |
| 6,056,258 A | 5/2000 | Swartz et al. | |
| 6,058,258 A | 5/2000 | Cullum et al. | |
| 6,181,432 B1 | 1/2001 | Furuya | |
| 6,186,492 B1 | 2/2001 | Dechaue et al. | |
| 6,246,188 B1 | 6/2001 | Funakoshi | |
| 6,264,188 B1 | 7/2001 | Taylor et al. | |
| 6,279,896 B1 | 8/2001 | Linder et al. | |
| 6,323,963 B1 | 11/2001 | Takahashi | |
| 6,398,206 B1 | 6/2002 | Yang et al. | |
| 6,574,014 B2 * | 6/2003 | Mandel et al. | 358/474 |
| 6,611,362 B2 | 8/2003 | Mandel et al. | |
| 2002/0186425 A1 | 12/2002 | Dufaux et al. | |
| 2003/0172795 A1 | 9/2003 | Belkir | |
| 2006/0203244 A1 | 9/2006 | Nilson et al. | |
| 2006/0215038 A1 | 9/2006 | Gruber et al. | |
| 2008/0316551 A1 | 12/2008 | Taylor et al. | |

FOREIGN PATENT DOCUMENTS

| | | |
|---|---|---|
| DE | 1561371 | 2/1970 |
| EP | 0427898 | 5/1991 |
| EP | 0779534 | 6/1997 |
| FR | 2757797 | 7/1998 |
| GB | 1269021 | 3/1972 |
| GB | 2010229 | 6/1979 |
| JP | 61228995 | 10/1986 |
| JP | 818744 | 1/1996 |
| WO | WO03016072 | 2/2003 |
| WO | WO03016072 A1 | 2/2003 |
| WO | WO 03016072 A1 | 2/2003 |

OTHER PUBLICATIONS

International Search Report and Written Opinion PCT/US08/67681 transmitted Aug. 15, 2008.
US Prosecution History for co-pending U.S. Appl. No. 12/143,072 as listed in Private PAIR on Sep. 23, 2008. Unpublished.
Unofficial copy of partial file history for U.S. Appl. No. 10/389,051.
Unofficial copy of partial file history for U.S. Appl. No. 12/143,072.
Unofficial copy of office action for Japanese patent application 2004536462.
Unofficial copy of an international search report for PCT patent application PCT/US09/31040 which corresponds to pending U.S. Appl. No. 12/353,753.

* cited by examiner

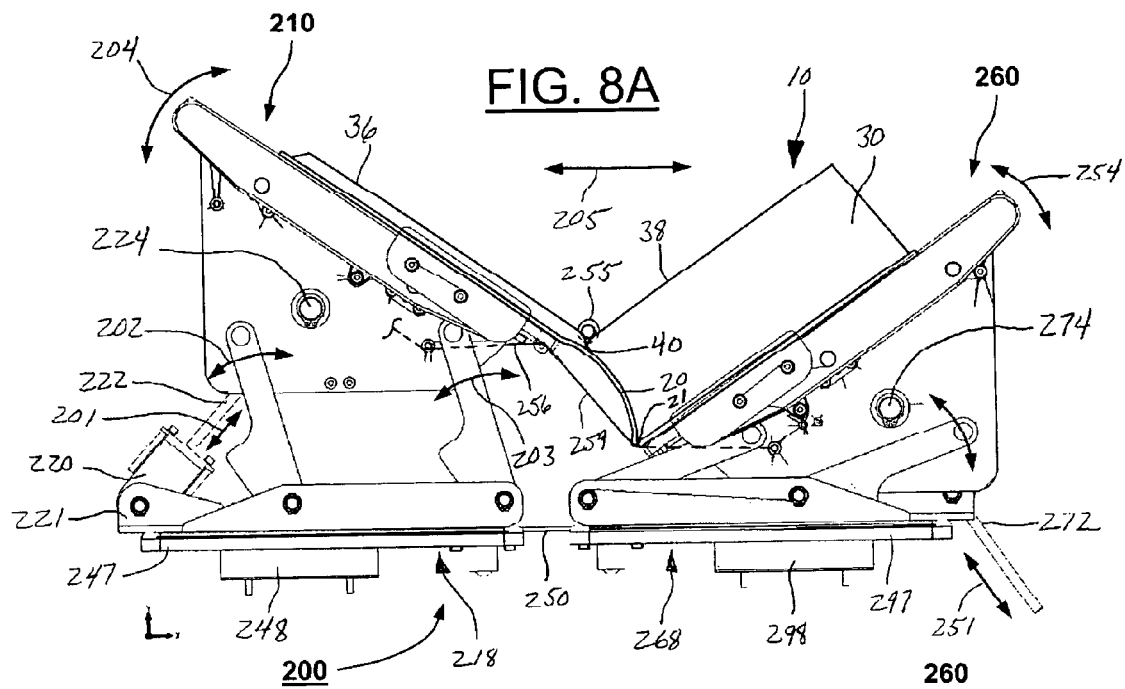
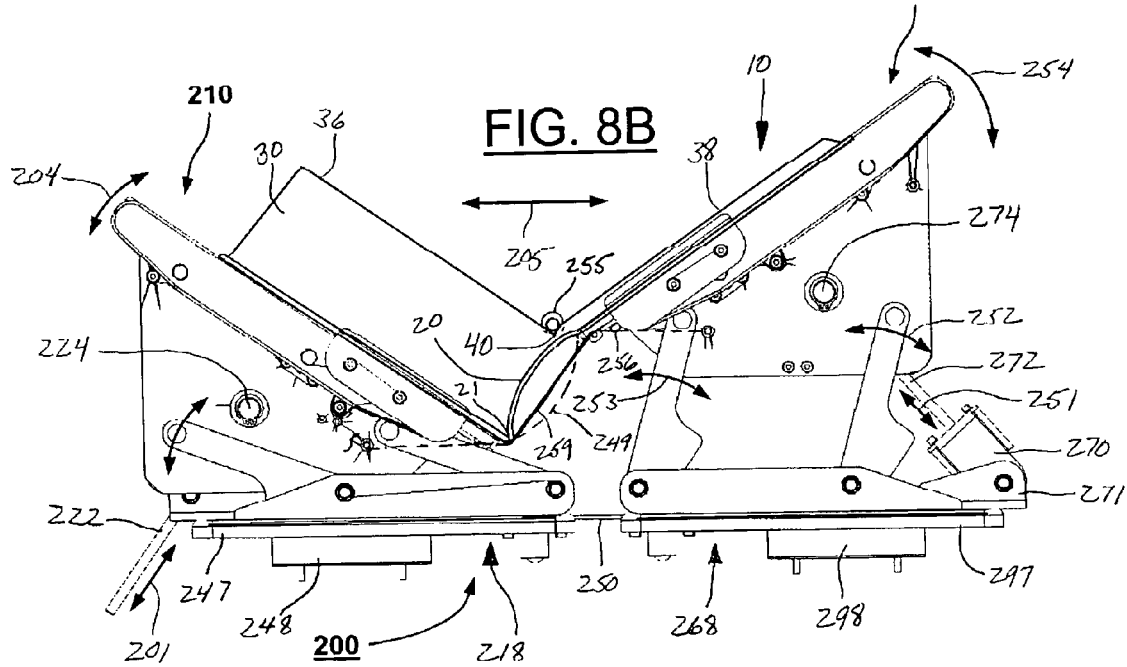

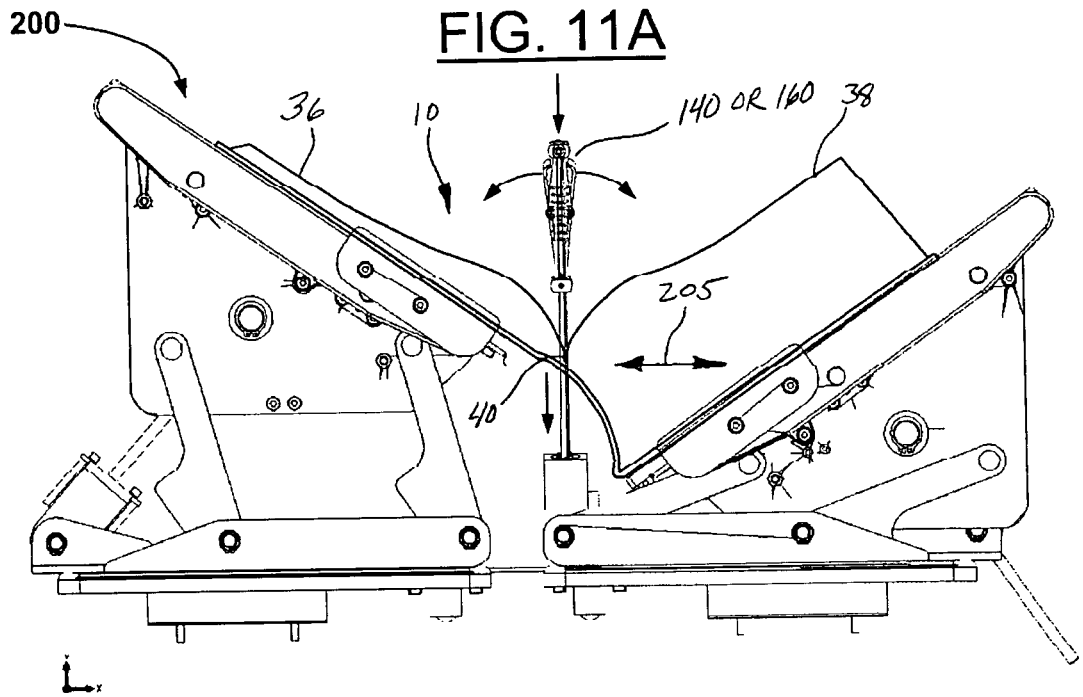
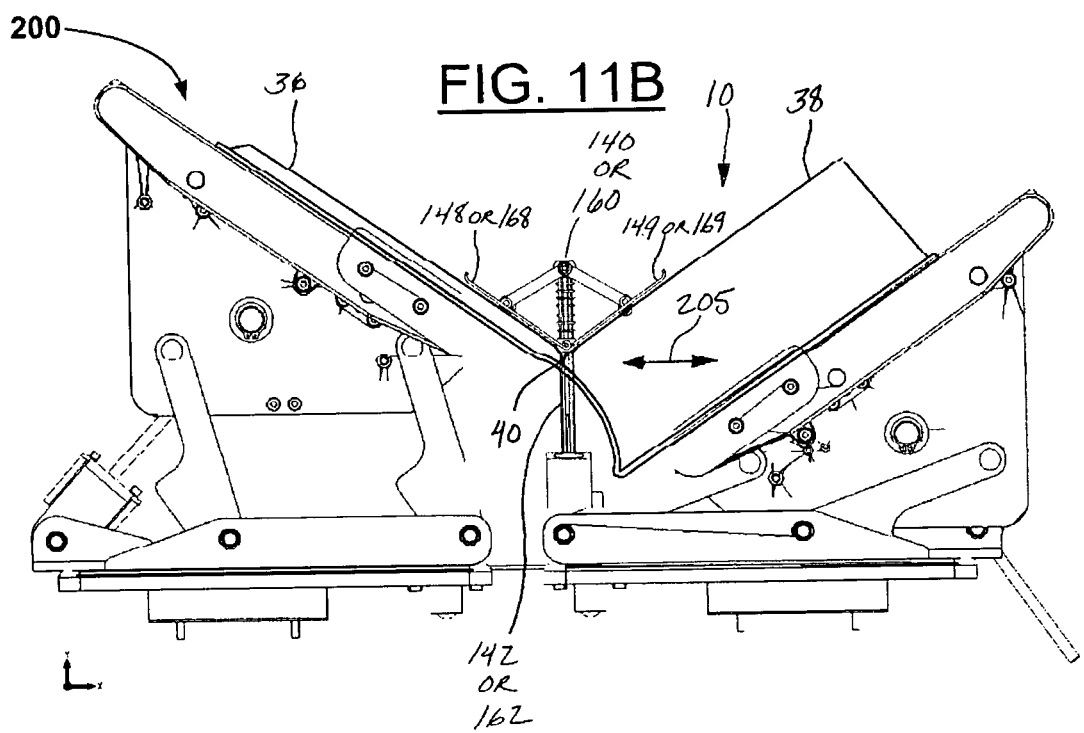

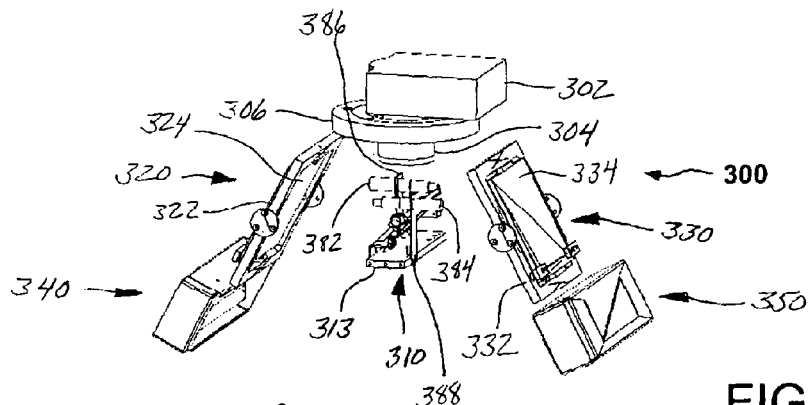
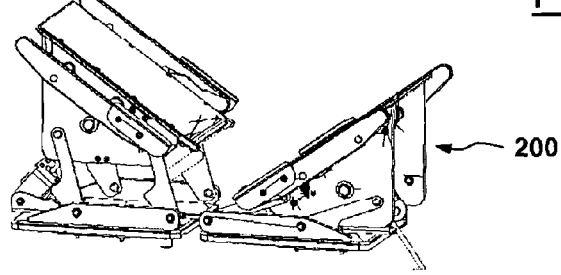
FIG. 12A
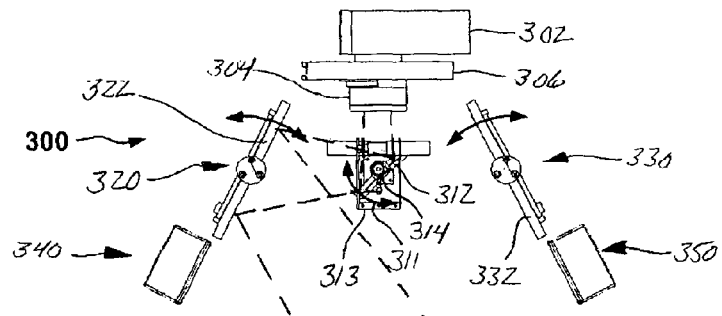
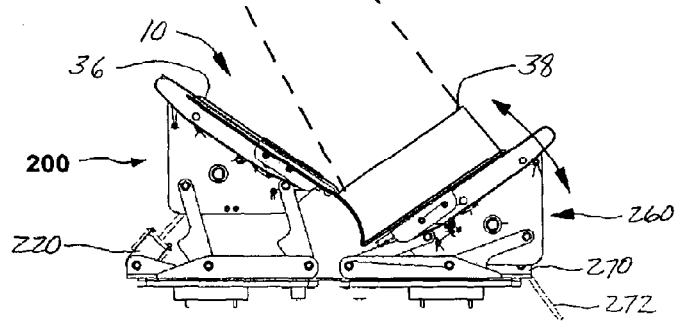
FIG. 12B

AUTOMATED PAGE TURNING APPARATUS TO ASSIST IN VIEWING PAGES OF A DOCUMENT

CROSS-REFERENCE TO RELATED APPLICATIONS

The following related applications are hereby incorporated by reference for their teachings:

"AUTOMATED APPARATUS TO ASSIST IN BOOK READING," Thomas N. Taylor et al., Application No. 60/409,399, filed Sep. 10, 2002; and "PAGE TURNING APPARATUS WITH A VACUUM PLENUM AND AN ADAPTIVE AIR FLUFFER," Lotfi Belkhir, application Ser. No. 10/389,051, filed Mar. 14, 2003.

This invention relates generally to an apparatus for use in viewing, reading or imaging pages of a document, and more particularly to an automated apparatus that facilitates viewing or reading of a book, or enables acquisition of book-like page images, wherein the book or document is held in a fixture, and each page is sequentially turned, precisely positioned, and presented to either a human reader, or an image acquisition system. Such an apparatus may be employed so that the information content of the document may assembled in analog or digital form for subsequent storage, distribution, and/or reprinting.

BACKGROUND OF THE INVENTION

A number of automated or semi-automated book scanning or reading systems are presently known in the art of book imaging, recording, and electronic archiving. In the use of such systems, a book is typically held in an open state, and a digital image of each page in sequence is acquired through either a digital camera, or an LED based scanner. One main function of such systems is to turn, and thereby expose to an imaging system, every page of a book in sequence.

It will be appreciated that a book or similar document reading system must overcome various problems. It is particularly desirable that a book reading system be capable of reading a large majority of books that are candidates for conversion to electronic format. For example, such a book reading system has utility in public and university libraries. Accordingly, a book reading system in such an application must be able to reliably read books with a wide range of physical properties or characteristics, without damaging such books.

Among the properties and conditions that an optimal book reading apparatus must accommodate are the following:

a) Physical size, i.e. the length and width of the book leaves, and the book cover board, if present.
b) Physical thickness of the book, i.e. substantially the number of leaves of the book, times the thickness of each page.
c) The thickness and paper composition of each leaf, and the properties related thereto (e.g., mass, stiffness, porosity, and the like).
d) The existence and characteristics such as elasticity of the book spine, i.e. whether the book spine remains flat when the book is opened, or whether it forms an arch, and to what extent it arches (radius of curvature). Alternatively, the leaves (pages) may be "bound" in a three-ring binder, or may simply be loosely assembled together without a binding.
e) The stiffness and support properties of the cover board on a hardcover book, versus the absence thereof on a paperback book.
f) The presence of anomalies in the structure of the book, such as a broken, creased, or split binding, rough-edged leaves, or other wear-and-tear, which result in variation in the properties of the book from leaf to leaf. Such anomalies would be considered as a source of noise in the art of statistical process control.
g) Variation in ambient conditions, such as relative humidity, which result in variability in the properties of the leaf paper, due to moisture absorption and desorption. Such variability would also be a source of noise to be accommodated by the book reading apparatus.

In addition to accommodating the variability from book-to-book, an automated book reading apparatus must also accommodate the variation in page location during the transition of open page location from the front of the book, to the back of the book. If an open book is held with its front and back covers in a fixed position, and the pages are sequentially turned, the physical location of the open pages will change due to the cumulative effect of the leaves being displaced from one side of the book to the other side, and also due to variation in leaf curvature, with respect to open page location.

Heretofore, a number of patents and patent applications have disclosed apparatus for book positioning and/or page turning, used in book reading, imaging, and recording, the relevant portions of which are hereby incorporated by reference for their teachings, and which may be briefly summarized as follows:

U.S. Pat. No. 6,264,188 B1 to Taylor et al, issued Jul. 24, 2001, discloses a sheet feeding apparatus having an adaptive air fluffer and an air plenum, which operate together to separate a top sheet from a stack of sheets therebelow.

U.S. Pat. No. 6,279,896 B1 to Linder et al, issued Aug. 28, 2001, discloses a sheet feeding apparatus including a vacuum source that is selectively actuable, a translating vacuum feed head attached to the vacuum source to acquire the top sheet of the stack, a unidirectional rotating drive mechanism, and a control circuit, which dynamically adjusts vacuum and positive pressures to ensure proper sheet feeding.

U.S. Pat. No. 6,398,206 B1 to Taylor et al, issued Jun. 4, 2002, discloses a sheet feeding apparatus having an air plenum with a corrugated surface, comprising a first set of ribs at a first height and a second set of ribs at a second height, which corrugates and separates a top paper sheet from a stack of paper sheets therebelow, regardless of the weight of the paper stock of the sheets.

U.S. Pat. No. 6,398,208 B1 to Taylor et al, issued Jun. 4, 2002, discloses a sheet feeding apparatus having an air plenum with a corrugated surface and with a leaky perimeter seal, which corrugates and separates a top paper sheet from a stack of paper sheets and seals thereto.

Some aspects of the present invention are directed to the application of a vacuum plenum having a corrugated surface as an aid to the separation and turning of pages in an open-book scanner. Scanners of the type in which the present application find a particular use are described, for example, in the following patents U.S. Pat. No. 6,056,258, U.S. Pat. No. 5,640,252 and U.S. Pat. No. 5,359,207. These patents and applications are hereby incorporated by reference into this specification for their teachings related to page turning, scanning and/or vacuum handling of paper sheets and pages.

SUMMARY OF THE INVENTION

It is therefore an object of this invention to provide an automated apparatus to provide for the turning of document pages such as bound books to assist, for example, with book reading. Such an apparatus can reliably present the leaves or pages of a book in sequence to a human reader or an image acquisition system, regardless of the document's length and width, thickness, leaf (page) properties, presence of a spine, spine properties, hard or soft cover, and state of wear-and-tear, and regardless of the ambient conditions in which the apparatus is located.

It is a further object of this invention to provide an automated apparatus to assist in viewing or reading of pages of the documents, which can attach to, and turn in sequence, every page beginning with a selected first page, and ending with a selected final page.

It is another object of this invention to provide an automated apparatus to assist in viewing or reading of bound documents, which can present every page in sequence to an image acquisition device, beginning with a selected first page, and ending with a selected final page, wherein every page is located within a field of view and a focal plane of the image acquisition device.

It is an object of this invention to provide an automated apparatus to assist in book reading, which can reliably present the pages of a book or similarly bound document in sequence to a human reader or an imaging system (for image viewing and/or capture), without damaging the book.

It is an additional object of this invention to provide an automated apparatus to assist in book reading, which can reliably acquire an image of every page in a book, beginning with a selected first page, and ending with a selected final page.

It is a further object of this invention to provide an automated book reading apparatus, which can reliably acquire and translate any book into an electronic format at a rate of approximately twenty pages per minute or higher.

In accordance with the present invention, there is provided an apparatus that enables acquisition of page images, comprising a base for supporting the operative assemblies and components of the apparatus, a cradle assembly having a first cradle half and a second cradle half, and a page turning assembly for presenting the pages to be imaged seriatim. Each of the cradle halves of the cradle assembly comprises a cradle base joined to a book support plate by a linkage, each cradle half further having a pair of book cover clamps, and a drive motor suitably operatively coupled to the book support plate, such that operation of the drive motor displaces the book support plate in an arcuate manner relative to the cradle base. The support plates of the first and second cradle halves are joined by a flexible web of material. The page turning assembly further comprises a page fluffer for separating an open page from the adjacent pages comprising the text block therebeneath, and a pivotable and translatable vacuum head for attaching to the separated open page and turning the separated open page.

In accordance with a further aspect of the present invention, there is provided an apparatus that enables acquisition of page images, further comprising an optical assembly comprising at least one camera, lighting directed at the open pages of the book, sensing means to detect the location of the open pages of the book relative to the field of view and focal plane of the camera, and at least one mirror to direct the images of the left open page and the right open page to the camera during an imaging cycle.

In accordance a further aspect of the present invention, there is provided an apparatus that enables acquisition of page images, further comprising open page securing and flattening means having a first page clamp and a second page clamp, each clamp being retractable prior to page turning and deployable prior to page imaging.

In accordance a further aspect of the present invention, there is provided an apparatus that enables acquisition of page images, further comprising page position adjustment means further comprising at least one motor operatively joined to at least one half of the cradle assembly, in order to horizontally translate the cradle assembly and the book held therein.

In accordance a further aspect of the present invention, there is provided an apparatus that enables acquisition of page images, further comprising page bifurcation position adjustment means further comprising optical sensing means for sensing the position of the page bifurcation of a book held within the cradle assemble of the apparatus.

In accordance a further aspect of the present invention, there is provided an apparatus that enables acquisition of page images, further comprising page edge detection means further comprising optical sensing means for sensing the position of the edge of a page as it is acquired by a vacuum head and turned by a page turning assembly.

In accordance with another aspect of the present invention, there is provided a method of reading, in seriatim, a plurality of pages in the nature of a book comprising the steps of securing the book in a cradle assembly, the book being opened to a selected first and second pages; adjusting the position of the book such that at least one of the first and second pages are entirely within the field of view of at least one image acquisition device; holding the at least one page in position for a period of time; displacing at least the outer edge of the second page from contact with subsequent adjacent pages; temporarily placing a vacuum head proximate to at least a portion of the surface of the second page; acquiring the second page with the vacuum head device; turning the second page about its line of contact with the binding of the book until the printed surface of the second page is substantially congruent with the printed surface of the first page; and releasing the second page from the vacuum head.

In accordance with another aspect of the present invention, there is provided a method of reading, in seriatim, a plurality of pages in the nature of a book comprising the steps of securing the book in a cradle assembly, the book being opened to a selected first and second pages; flattening at least one of the first and second pages of the book, securing at least one of the first and second pages of the book with at least one page clamping device such that said at least one page is within the field of view and focal plane of at least one image acquisition device; adjusting the position of the book such that at least one of the first and second pages are entirely within the field of view of at least one image acquisition device; holding the at least one page in position for a period of time; releasing the page clamping device; displacing at least the outer edge of the second page from contact with subsequent adjacent pages; temporarily placing a vacuum head proximate to at least a portion of the surface of the second page; acquiring the second page with the vacuum head device; turning the second page about its line of contact with the binding of the book until the printed surface of the second page is substantially congruent with the printed surface of the first page; and releasing the second page from the vacuum head.

The apparatus and methods presently described are advantageous because they are capable of being adapted to a wide range of books or similar bound and unbound documents for which it is desired to capture, view and/or record images in seriatim of the pages therein. In particular, the apparatus of the present invention is capable of reliably separating and turning the pages of a document such as a book, and in accommodating the wide variations in geometry between books, as they are held and processed by the apparatus. As a result of the invention, repositories of large volumes of books will have the option of recording, archiving, and distributing the information contained therein in either analog image format, or in exceedingly compact and transmittable digital format.

BRIEF DESCRIPTION OF THE DRAWINGS

The invention will be described by reference to the following drawings, in which like numerals refer to like elements, and in which:

FIG. 8A is an elevation view of the cradle assembly of the present invention, further depicting a book held by the cradle assembly, shortly after the beginning of the page imaging process.

FIG. 8B is an elevation view of the cradle assembly of the present invention, further depicting a book held by the cradle assembly, shortly before the end of the page imaging process.

FIG. 11A is an elevation view of the cradle assembly of the present invention, further depicting a book held by the cradle assembly, and a page clamp in the released position.

FIG. 11B is an elevation view of the cradle assembly of the present invention, further depicting a book held by the cradle assembly, and a page clamp in the clamped position.

FIGS. 12A and 12B are a perspective view and an elevation view, respectively, of an optical assembly of the apparatus of the present invention.

Figure 1A:
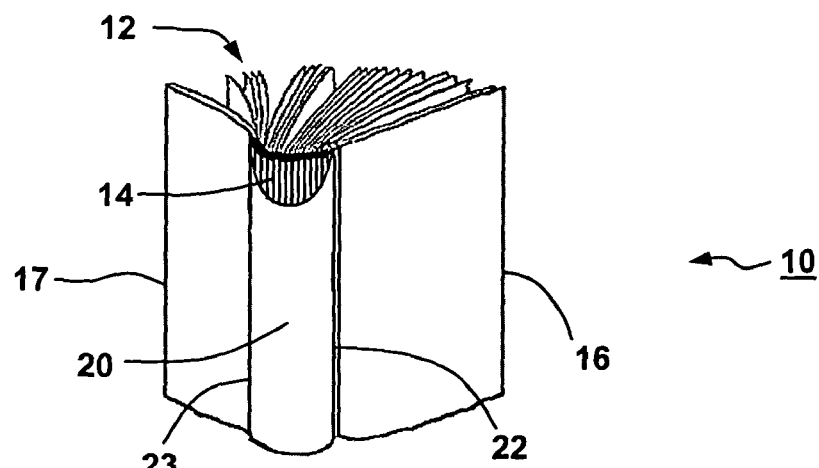
FIG. 1A-1C are perspective views of a book, taken from various angles, which are provided to define terminology used in this specification.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENTS

For a general understanding of the present invention, reference is made to the drawings. In the drawings, like reference numerals have been used throughout to designate identical elements. In describing the present invention, a variety of terms are used in the description. Standard terminology is widely used in book manufacturing art, and in library art. For example, one may refer to the web sites "Glossary of Book Terms" at http://www.alibris.com/glossary; and "Glossary of Book Terms: Condition, Anatomy, Size & Abbreviations" of the Alibris Corporation of Emeryville, Calif., the disclosures of which are incorporated herein by reference.

Although the term "book" is used herein to describe particular embodiments and aspects of the present invention, the term is intended to broadly represent various types of bound documents where the pages thereof are folded and/or connected to one another so as to be viewed or read in seriatim—such as three-ring notebooks, etc. Examples of such documents include sheet music, reports, fanfold computer printouts. It is further anticipated that a series of unbound pages may be handled in a manner similar to that described relative to the following embodiments and that the set of unbound pages would turn about a common edge or axis.

Figure 1B:
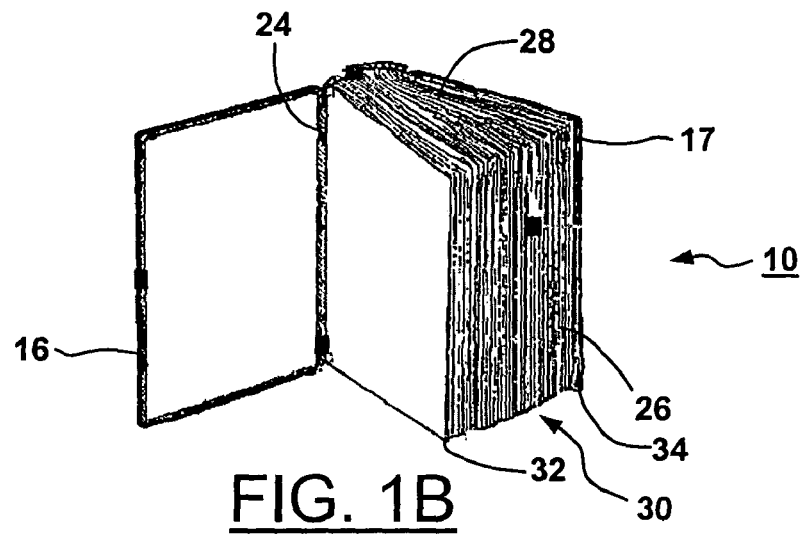
Figure 1C:
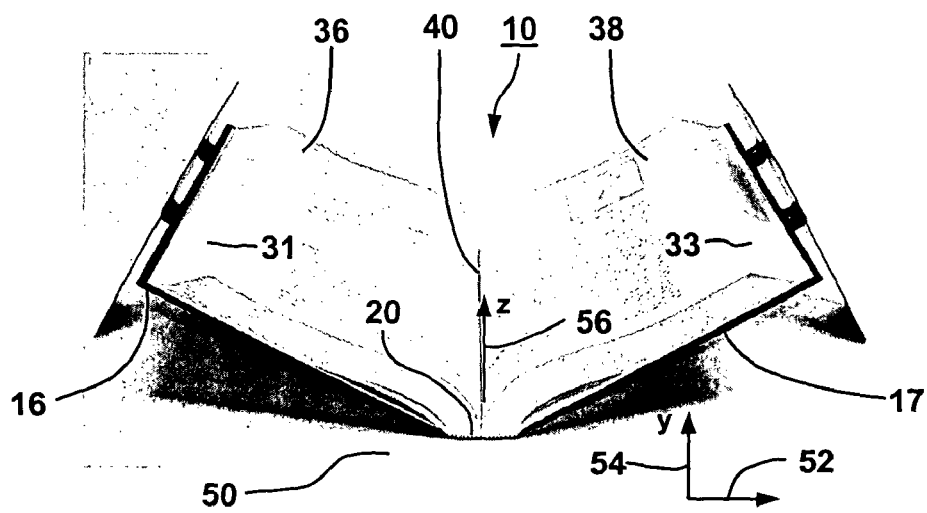

FIG. 1A-1C are perspective views of a book, taken from various angles and with the book in several positions, for purposes of defining terms used in this specification. Referring to FIG. 1A, a typical book 10 comprises a collection of printed sheets or leaves 12, joined at one side thereof by binding 14, which may further comprise sewn thread, staples, adhesives, various combinations thereof, and/or other materials and fastening means known in the art of book binding. Book 10 further comprises a front cover 16 and a back cover 17, joined to spine 20 at joints 22 and 23. As noted above, the present invention is further intended to apply to a series of documents that are held in a 3-ring notebook binder, or even an unbound stack of documents, wherein the pages are held, turned and maintained in a seriatim relationship as they are turned, even though there is no spine or similar mechanism for binding the edges of the stack.

Referring to FIG. 1B, the material at joint 22 (of FIG. 1A) is flexible, and forms a hinge 24, which pivotably joins front cover 16 to spine 20. A similar hinge (not shown) joins back cover 17 to spine 20. Covers 16 and 17 may be thin and flexible, commonly a heavy paper stock, wherein covers 16 and 17 are known as wrappers, and book 10 is generally referred to as a paperback book. Alternatively, covers 16 and 17 may comprise a thicker, substantially rigid paperboard material, overlayed with cloth, leather, and the like, wherein book 10 is generally referred to as a hardcover book.

The surface 26 of the leaves 12 of the book 10, which is opposite spine 20, is known as the fore-edge of the book. The surface 28 of the leaves 12 along the top of the book 10 is known as the top edge. In like manner, the surface (not shown) of the leaves 12 along the bottom of the book 10 is known as the bottom edge. The entire collection of bound leaves from the first leaf 32 to the last leaf 34 is known as the text block 30. Accordingly, when referring to a single leaf, the same terms refer to the edges of the particular leaf, which form these respective surfaces. The edge of any leaf that is joined to binding 14 of FIG. 1 is known as a bound edge (not shown).

FIG. 1C is a perspective view of a book resting upon a horizontal surface 50, and supported in an open position, in approximately the position a typical human reader would hold said book while reading it. Referring to FIG. 1C, two pages are exposed for viewing by a human reader, or for image recording by an imaging device. In the library arts, left page 36 is known as the verso page, and right page 38 is known as the recto page. For the purposes of describing the present invention, the V-shaped intersection 40 between verso page 36 and recto page 38, which is present when book 10 is in an open state, is known as the page bifurcation. In referring to a Cartesian coordinate system in this specification, the x-direction is defined by arrow 52, the y-direction is defined by arrow 54, and the z-direction is defined by arrow 56. The z-direction is along page bifurcation 40, such that the x- and z- axes define the horizontal plane of surface 50, and the y-axis is in the vertical direction, orthogonal to surface 50.

For purposes of describing the present invention, the height of a book is considered to be the distance from the top edge of a cover to the bottom edge of a cover; the width of a book is considered to be the distance from the spine of the book to the fore edge of a cover; and the thickness of a book is considered to be the distance from the outer surface of the front cover to the outer surface of the back cover, when the book is in a closed state. The height of a leaf (or page) of a book is considered to be the distance from the top edge of the leaf to the bottom edge of the leaf, and the width of a leaf (or page) is considered to be the distance from the bound edge of the leaf to the fore edge of the leaf.

FIG. 1C depicts a book in an open state. For the purposes of this specification, an open state, or open, is meant to indicate that two book pages are visible to a human reader, or are in a position such that images of the pages may be recorded by an imaging device. In practice, a book is therefore in an open state when the angle formed by the intersection of the planes defined by the front and back covers of the book is between approximately 90 degrees and 180 degrees. The term open pages refers to the pair of pages, which are readable or imageable when the book is in an open state, i.e. the verso page and the recto page.

As used herein, the act of turning a page forward is defined as the sequence of contacting and grasping or acquiring with fingers, or some apparatus, a leaf comprising a recto page, and pivotally rotating said page about its bound edge, until the surface of said page is in contact with the surface of the former verso page, and the exposed surface of the rotated leaf is the new verso page. Turning a page backwards is the act of displacing a page in a similar manner, but in the opposite direction.

The term pages in sequence is meant to indicate the order in which a human reader or an apparatus would encounter the pages of a book if such person were to commence with the first page of the text block, adjacent to the front cover, and sequentially turn pages until the last page is reached, adjacent to the back cover.

The foregoing description is provided from the standpoint of how most conventional books are read, i.e. seriatim from front cover to back cover, wherein text or other information generally is read from left to right. However, books exist, for which the reader may orient the spine, for example, at the top, and turn the pages from bottom to top, or top to bottom. Furthermore, some languages read in directions other than left to right, which may affect the manner in which a book is read. It may also be desirable to read or acquire images of the pages of a book in other than their ordered sequence. It will therefore be appreciated that minor changes in the software, hardware, and/or sequence of operations would be straightforward in order to assist the reading of such books in a desired manner with the present invention, and are therefore within the scope of the present invention.

As will be noted below, the various embodiments the present invention are intended to cover a broad range of possible uses. For example, although described as a page-turning book scanner, the present invention may also be employed as an input source for a reading system for blind users, or as a source of image data to be displayed in magnified form for other visually impaired individuals.

Similarly, various aspects of the present invention may be used independently or in conjunction with other devices. As an example, the page clamping mechanisms of the present invention may be used with bound documentation systems such as catalogs or manuals. One might envision the page clamping mechanism being used in a zero-gravity environment to hold the pages of a book in place so that a user may view the pages while working with both hands.

As another example, aspects of the page turning mechanism described below may be used to advance sheet music pages for a musician or conductor while a musical composition is being performed. Similarly, the device may be used to enable viewing of books by researchers, wherein the books are maintained within a controlled environment and the user simply pushes "page forward" or "page backward" buttons.

Having described various potential applications for the present invention and its various components, attention is now turned to further description of the details of an embodiment of the present invention.

Figure 2A:
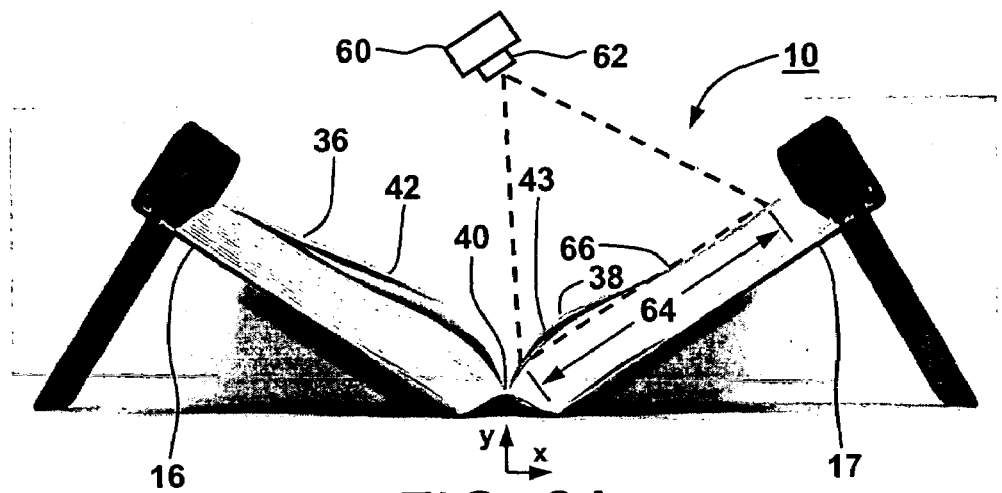
FIG. 2A is a side elevation view of image recording means and of a book, which is open to a page location approximately in the center of the text block.
Figure 2B:
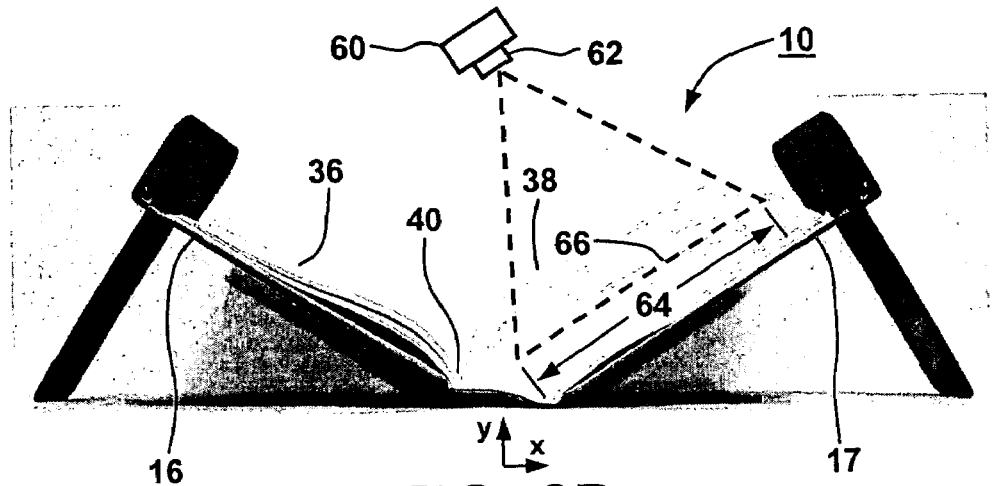
FIG. 2B is a side elevation view of image recording means and of a book, which is open to a page location near the front cover of the book.
Figure 2C:
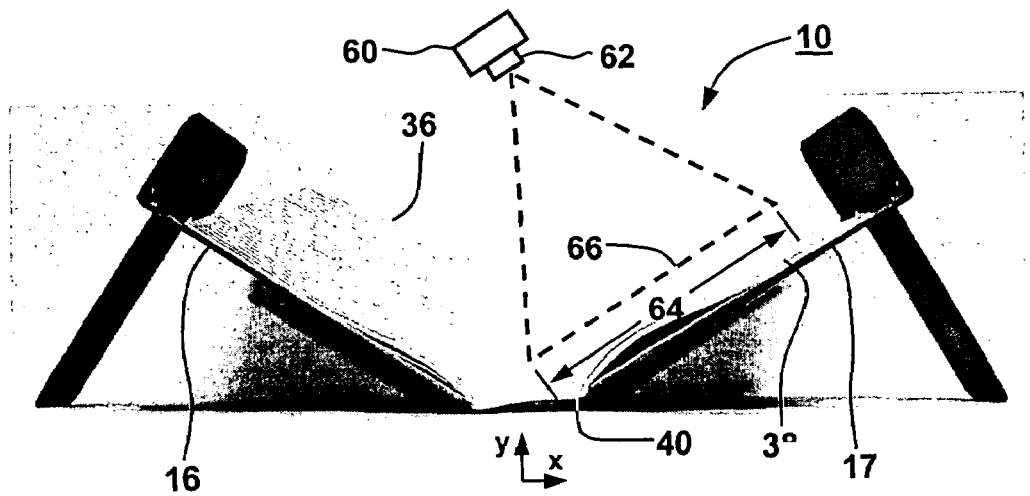
FIG. 2C is a side elevation view of image recording means and of a book, which is open to a page location near the back cover of the book.

FIGS. 2A-2C are side elevation views of image recording means and of a book, which is open to page locations approximately in the center of the text block, near the front cover of the book and near the back cover of the book, respectively. A comparison of the dimensions of the book and the relationship of the open pages to the image recording means at these three page locations is instructive in comprehending problems which are overcome by the present invention.

Referring to FIGS. 2A-2C, an image recording means is provided such as, a camera 60 comprising lens 62. Camera 60 may be a still frame camera, a video camera, a movie camera, a film camera, a digital camera, and the like. In FIGS. 2A-2C, camera 60 is maintained in a fixed position with respect to book 10. In such position, camera 60 has a field of view of width 64, and a height in the z direction (not shown), and a focal plane along dotted. line 66, and in the z-direction. It will be apparent that camera 60 as shown in FIGS. 2A-2C is shown only as recording recto page 38, but that this discussion applies in like manner to verso page 36, and that an additional camera, or mirror mechanism may be provided to record images of verso page 36.

In FIG. 2A, camera 60 is positioned such that focal plane 66 and the surface of recto page 38 are proximate to each other, when book 10 is open to approximately the center of the text block. In FIG. 2B, wherein book 10 is open to a page near the front cover 16, and the bulk of the text block lies upon cover 17, recto page 38 is significantly closer to camera 60, and correspondingly displaced above focal plane 66. In like manner, in FIG. 2C, wherein book 10 is open to a page near the back cover 16, and the bulk of the text block lies upon cover 16, recto page 38 is significantly further away from camera 60, and correspondingly displaced below focal plane 66. It is apparent therefore, that a satisfactory apparatus to assist in the automated imaging of a book must make an adjustment in the location of the focal plane 66 of camera 60 as a function of the open page location of book 10, in order to obtain a focused image of each recorded page.

Referring again to FIGS. 2A-2C, one common method of adjusting the focal plane 66 of camera 60 would be through the adjustment of lens 62. However, such an action would be insufficient to enable camera 60 to record an image of the page for several reasons. As pages are turned from a location near the front cover 16 of book 10 (FIG. 2B), to a location near the center of book 10 (FIG. 2A), to a location near the back cover 17 of book 10, while book 10 and covers 16 and 17 in particular are held in a fixed position, the location of page bifurcation 40 also changes substantially in the x-direction. Accordingly, the location of the open pages forming page bifurcation 40 change with respect to the location of camera 60. A suitable apparatus to assist in image recording of a book must accommodate such a change in location.

It is also apparent that the surfaces of verso page 36 and recto page 38 of FIGS. 2A-2C are also curved, rather than planar. Referring to FIG. 2A in particular, the effect of the binding of folded leaves into groups known as signatures is visible, wherein stresses in signatures 42 and 43 produce significant curvature in verso page 36 and recto page 38. It can be seen, for example, that a portion of recto page 38 near its bound edge is above focal plane 66, and a portion of recto page 38 near its fore-edge is below focal plane 66. Therefore, the recording of a clear, focused image of recto page 38 by camera 60 is not possible without some further provision to render recto page 38 and focal plane 66 congruent.

Figure 3A:
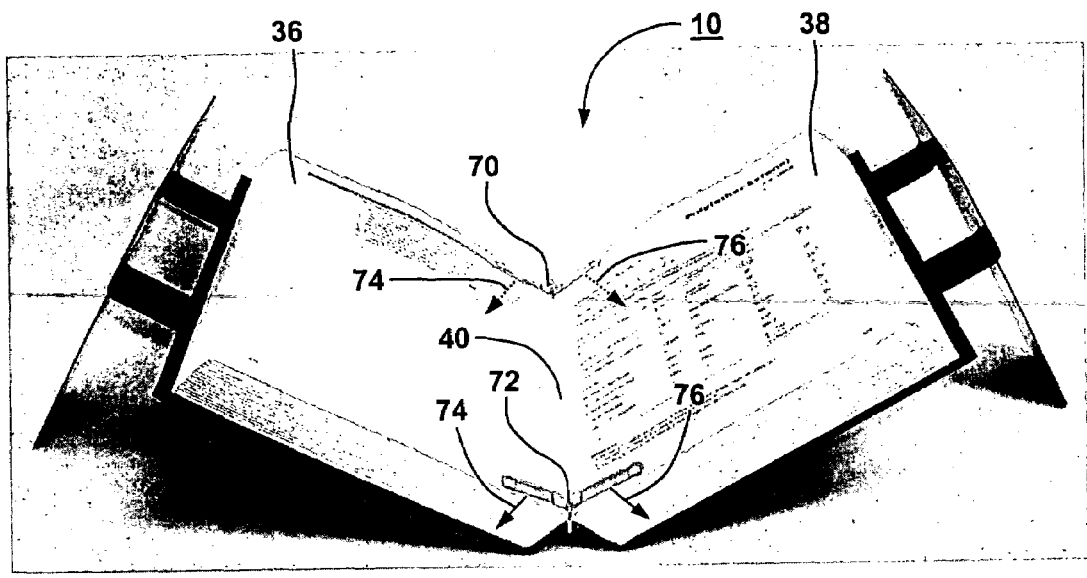
FIG. 3A is a perspective view, which depicts means to flatten the pages of a book into substantially planar surfaces.
Figure 3B:
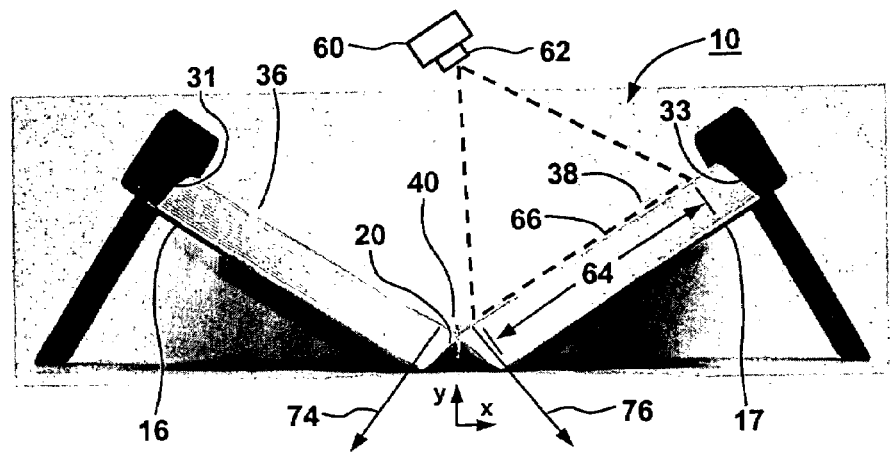
FIG. 3B is a side elevation view, which depicts means to flatten the pages of a book into substantially planar surfaces.

FIG. 3A is a perspective view, which depicts clamps or similar means to flatten the bifurcation and pages of a book so as to produce substantially planar surfaces for each page. Referring to FIG. 3A, upper V-clamp 70 and lower V-clamp 72 are secured to book 10 at page bifurcation 40. V-clamps 70 and 72 apply forces that are substantially normal to pages 36 and 38, as indicated by arrows 74 and 76 respectively. The resulting effect of such forces is depicted in FIG. 3B, wherein recto page 38 is rendered substantially congruent with focal plane 66 of camera 60. Accordingly, a clear, focused image of recto page 38 by camera 60 is made possible.

To summarize, a satisfactory apparatus to assist in the automated imaging of a book must precisely present each page of the book to an imaging system, in order to acquire a clear, complete, and focused image of each page. In order to accomplish this, the apparatus preferably provides means to flatten the open pages of a book, and locate the open pages within the focal plane and field of view of the camera or other image recording means, in order to obtain a clear, complete, and focused image of each page, regardless of the location of the open pages within the book. These features that accommodate variability due to page location within a book are highly advantageous and strongly preferred, in addition to features that accommodate the variability of pages from book-to-book, which were previously described. The apparatus of the present invention, which accommodates page-to-page and book-to-book variability in a manner superior to prior art apparatus, is now described.

Figure 4A:
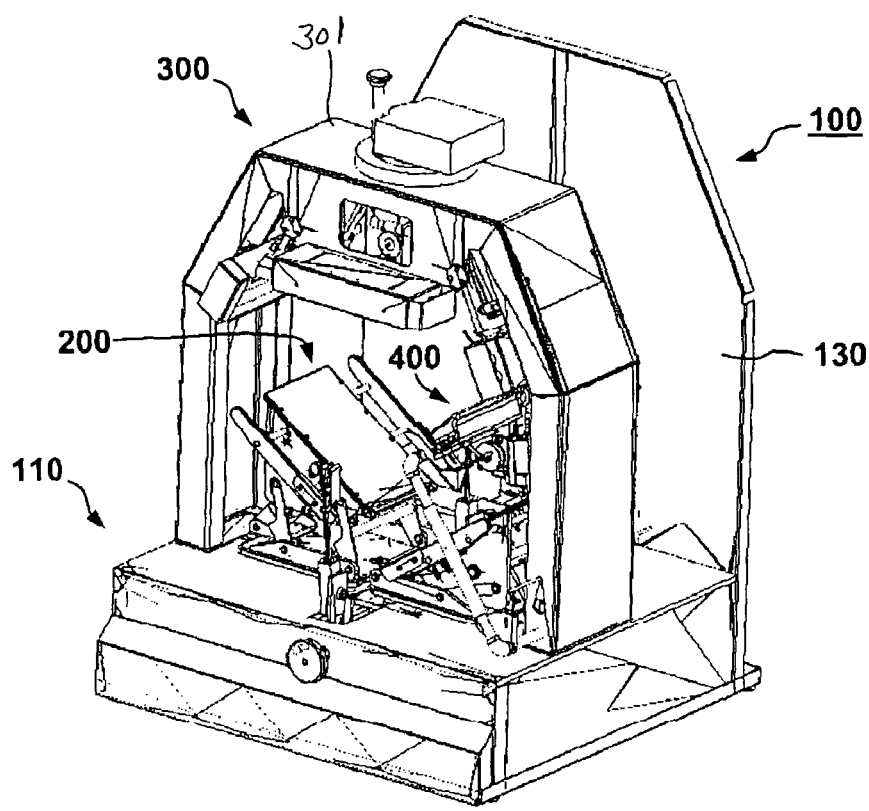
FIGS. 4A and 4B are a perspective view and an elevation view, respectively, of one embodiment of the automated apparatus of the present invention.
Figure 4B:
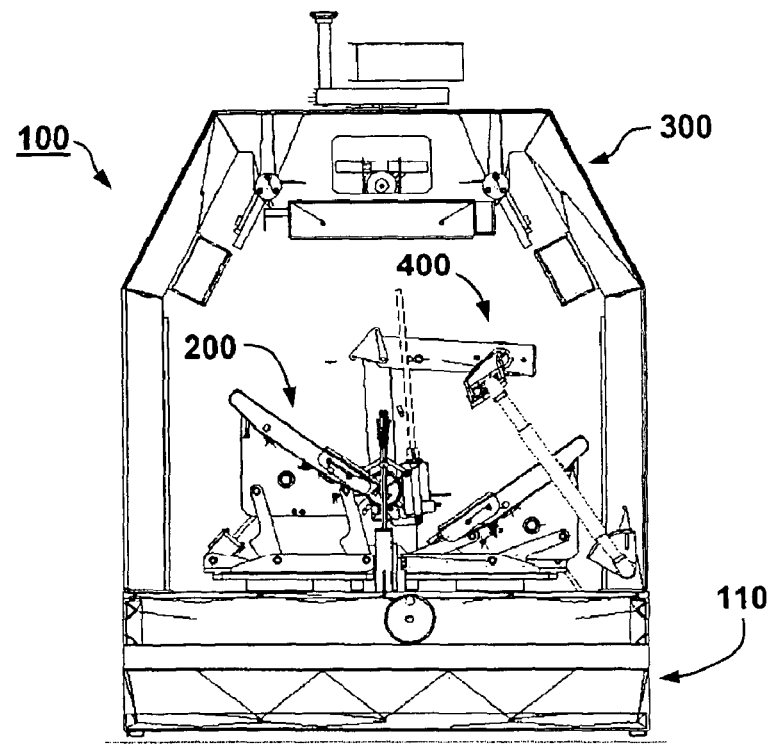

FIGS. 4A and 4B are a perspective view and an elevation view, respectively, of one embodiment of the automated apparatus of the present invention. Referring to FIGS. 4A and 4B, apparatus 100 comprises several assemblies, which operate together to perform the process of automated image acquisition of the pages of a book. Base 110 and back plate 130 support and/or house the mechanical and imaging components of apparatus 100. Cradle assembly 200 holds a book (not shown) in position, and presents the open pages of the book for image acquisition. Optical assembly 300 comprises a camera, mirrors, lighting, and page position sensors for obtaining a clear, complete, and focused image of each page of the book. Page turning assembly 400 comprises a fluffer for raising and isolating a leaf to be turned, and a page turning arm and head for acquiring the leaf and turning it such that a subsequent pair of open pages are made available for the image acquisition cycle. Each of these assemblies are further described in detail in this specification, and in FIGS. 6A through 17.

Cradle Assembly

Figure 6A:
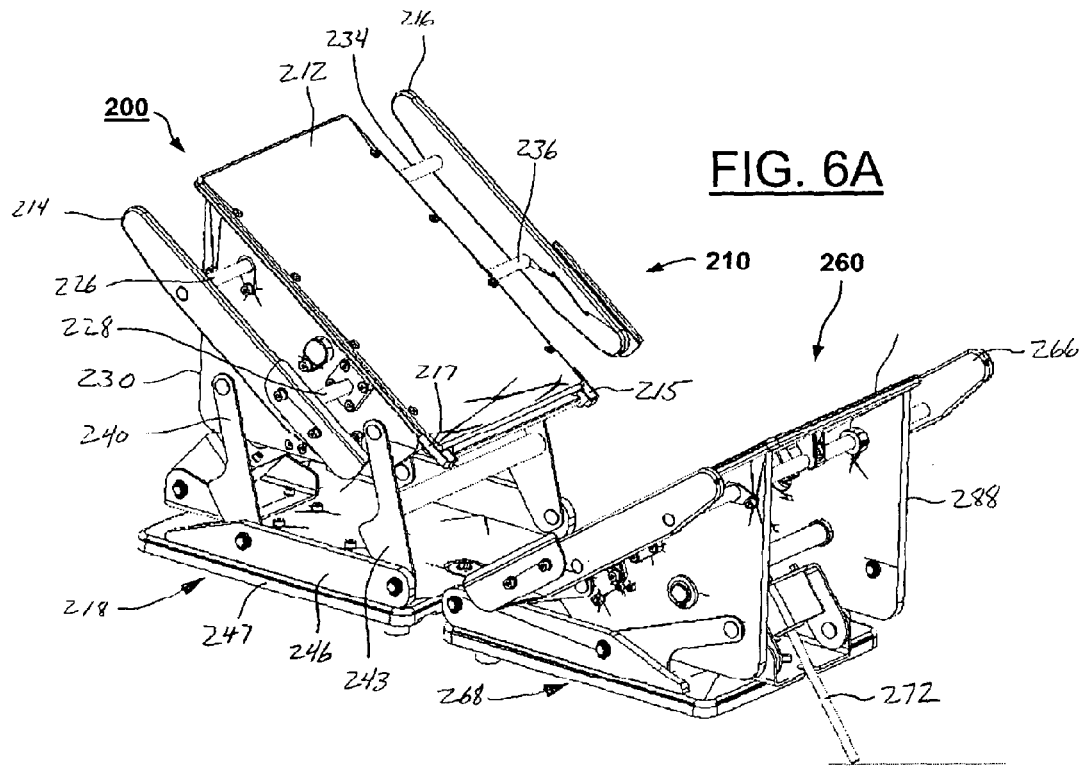
FIGS. 6A and 6B are a perspective view and an elevation view, respectively, of a cradle assembly of the apparatus of the present invention.
Figure 6B:
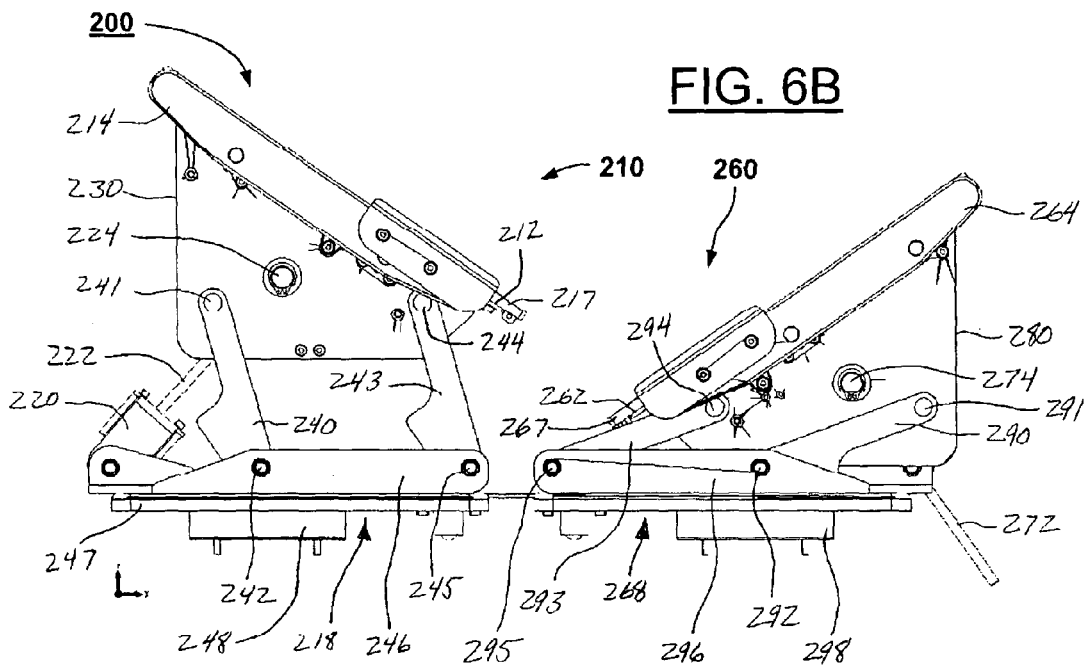
Figure 7A:
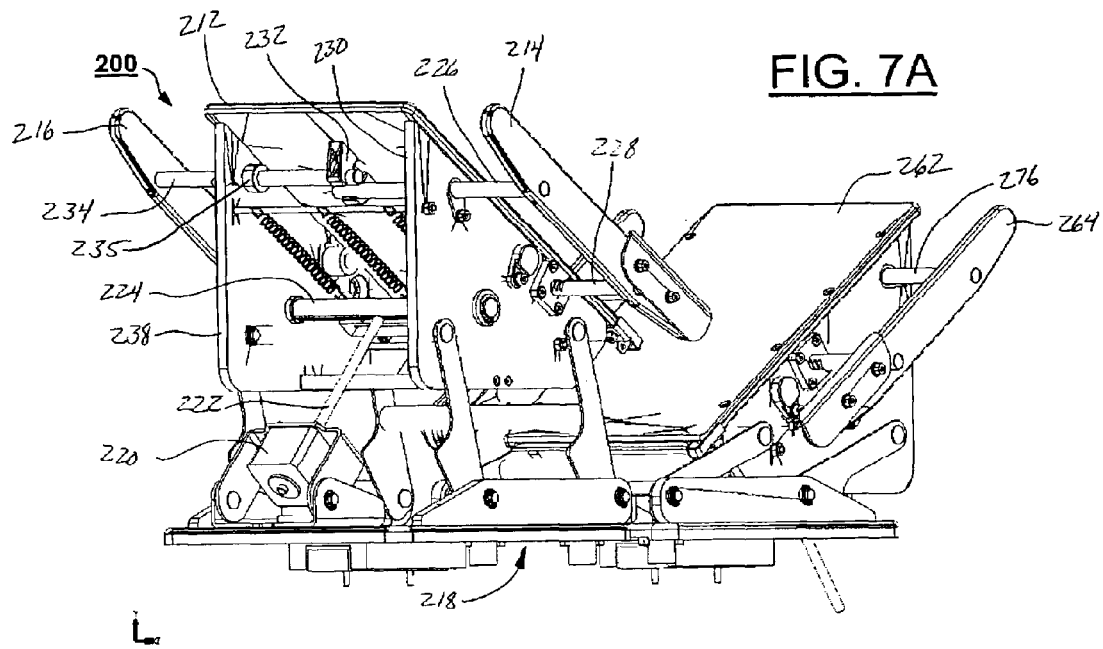
FIGS. 7A and 7B are additional elevation views from the left front and right front, respectively, of a cradle assembly of the apparatus of the present invention.
Figure 7B:
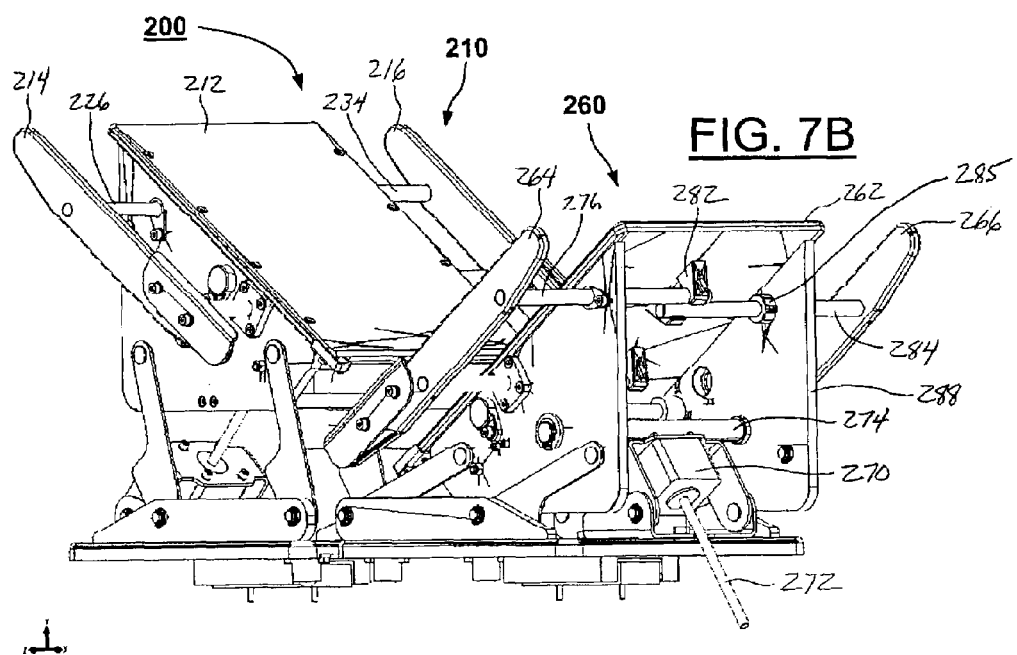
Figure 9A:
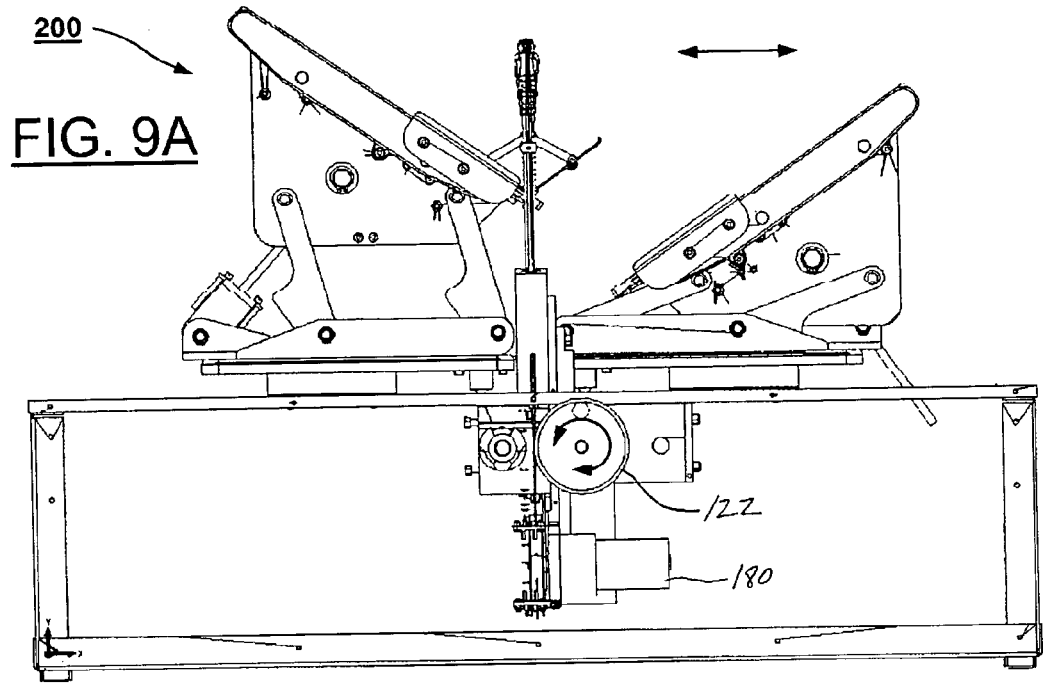
FIG. 9A is a front elevation view of the cradle assembly and clamp and cradle adjustment mechanisms housed in the base of the apparatus.
Figure 9B:
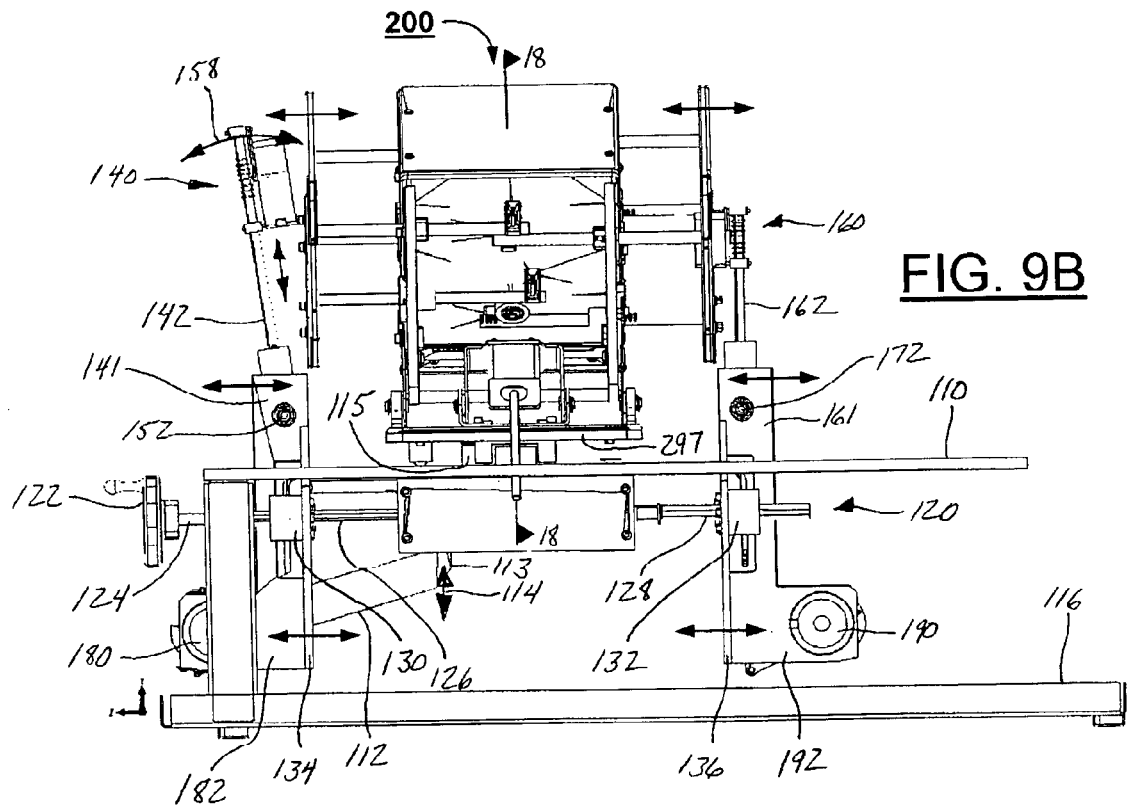
FIG. 9B is a side elevation view of the cradle assembly and clamp and cradle adjustment mechanisms of FIG. 9A.

The components and function of cradle assembly 200 is presently described in detail by reference to the drawings as follows: FIGS. 6A and 6B are a perspective view and an elevation view, respectively, of a cradle assembly of the apparatus of the present invention. FIGS. 7A and 7B are additional elevation views from the left front and right front, respectively, of a cradle assembly of the apparatus of the present invention. FIG. 8A is an elevation view of the cradle assembly of the present invention, further depicting a book held by the cradle assembly, shortly after the beginning of the page imaging process. FIG. 8B is an elevation view of the cradle assembly of the present invention, further depicting a book held by the cradle assembly, shortly before the end of the page imaging process. FIG. 9A is a front elevation view of the cradle assembly and clamp and cradle adjustment mechanisms housed in the base of the apparatus. FIG. 9B is a side elevation view of the cradle assembly and clamp and cradle adjustment mechanisms of FIG. 9A.

Referring to FIGS. 6A, 6B, 7A, and 7B, cradle assembly 200 comprises a left cradle half 210 and a right cradle half 260. Left cradle half 210 further comprises book support plate 212, book cover clamps 214 and 216, linkage 218, drive motor 220, drive shaft 222, and lift rod 224. In like manner, right cradle half 260 further comprises book support plate 262, book cover clamps 264 and 266, linkage 268, drive motor 270, drive shaft 272, and lift rod 274.

Book cover clamp 214 is joined to rods 226 and 228, which are slidably mounted through front upright plate 230, and through upper block guide 232 and lower block guide (not shown), respectively. Book cover clamp 216 is joined to rods 234 and 236, which are slidably mounted through rear upright plate 238, and through upper block guide 232 and lower block guide (not shown), respectively. Book cover clamp 216 is retained within cradle assembly 200 by the use of shaft collar 235, which is attached to rod 234. In like manner, book cover clamp 214 is retained within cradle assembly 200 by the use of a similar shaft collar (not shown), which is attached to rod 226.

In like manner, on right cradle half 260, book cover clamp 264 is joined to rods 276 and 278, which are slidably mounted through front upright plate 280, and through upper block guide 282 and lower block guide (not shown), respectively. Book cover clamp 266 is joined to rods 284 and 286, which are slidably mounted through rear upright plate 288, and through upper block guide 282 and lower block guide (not shown), respectively. Book cover clamp 266 is retained within cradle assembly 200 by the use of shaft collar 285, which is attached to rod 284. In like manner, book cover clamp 264 is retained within cradle assembly 200 by the use of a similar shaft collar (not shown), which is attached to rod 276.

On the front side of left cradle half 210, linkage 218 comprises links 240 and 243, which are pivotably joined to front upright plate 230 by pins 241 and 244, respectively. Links 240 and 243 are also pivotably joined to lower plate 246 by pins 242 and 245, respectively. Lower plate 246 is joined to left cradle base 247. Linkage 218 is further comprised of a set of substantially the same components (not shown) on the rear side of left cradle half 210.

In like manner, on the front side of right cradle half 260, linkage 268 comprises links 290 and 293, which are pivotably joined to front upright plate 280 by pins 291 and 294, respectively. Links 290 and 293 are also pivotably joined to lower plate 296 by pins 292 and 295, respectively. Lower plate 296 is joined to right cradle base 297. Linkage 268 is further comprised of a set of substantially the same components (not shown) on the rear side of right cradle half 260.

The aforementioned components of cradle assembly 200 enable it to be adjusted to suitably image the pages of books of a wide range of page sizes and thicknesses, and to properly present each pair of open pages of a book for image acquisition, wherein the open pages are properly located within the focal plane and field of view of the camera in order to acquire a clear, complete, and focused image of each page. The operation of cradle assembly 200 to accomplish such task is now described.

FIG. 8A is an elevation view of the cradle assembly of the present invention, further depicting a book held by the cradle assembly, shortly after the beginning of the page imaging process; and FIG. 8B is an elevation view of the cradle assembly of the present invention, further depicting a book held by the cradle assembly, shortly before the end of the page imaging process. Referring to FIGS. 8A and 8B, book 10 is held in cradle assembly 200. At the beginning of the book imaging process, and prior to the imaging of any pair of open pages, the position of verso page 36 is adjusted by the operation of cradle half 210, and the position of recto page 38 is adjusted by the operation of cradle half 260.

To adjust the position of verso page 36 a positioning means is employed, for example, drive motor 220, which is pivotably joined to left cradle base 247 by bracket 221, is operated. Drive motor 220 moves drive shaft 222 along its axis in the directions indicated by arrow 201. Lift rod 224, being joined to drive shaft 222, is displaced accordingly, and further produces the action of linkage 218, indicated by arcuate arrows 202 and 203. Thus, the position of left cradle half 210 and verso page 36 of book 10, indicated by arcuate arrow 204, is adjusted by operation of drive motor 220.

In like manner, to adjust the position of recto page 38 a positioning means is employed, for example, drive motor 270, which is pivotably joined to left cradle base 297 by bracket 271, is operated. Drive motor 270 moves drive shaft 272 along its axis in the directions indicated by arrow 251. Lift rod 274, being joined to drive shaft 272, is displaced accordingly, and further produces the action of linkage 268, indicated by arcuate arrows 252 and 253. Thus, the position of right cradle half 260 and verso page 38 of book 10, indicated by arcuate arrow 254, is adjusted by operation of drive motor 270.

The horizontal position of book 10 is further adjustable in the x-direction, indicated by arrow 205. Left cradle half 210 and right cradle half 260 are joined by cradle hitch 250, and are slidably mounted on left slide mechanism 248 and right slide mechanism 298, which in turn are joined to a base 110. (See FIG. 9A.) To effect the motion indicated by arrow 205, the assembly comprising left cradle half 210, right cradle half 260, and link 250 are operatively coupled to a drive motor (not shown) or similar positioning means, which adjusts the position of the cradle halves in the x-direction. In an alternative embodiment, the cradle is moved in response to the motion of a clamping mechanism or similar device that may be connected to the cradle. In particular a cam-type locking mechanism may be employed such that the cradle, or at least halves thereof, are free to move when a clamping mechanism is engaged with the book—thereby enabling the self-centering or adjustment of the cradle halves in response to the clamp force. And, the cradle halves are locked in horizontal position when the clamps are removed, in order to hold the book in a centered position for page turning. In an alternate embodiment (not shown), cradle hitch 250 is not present, and each of cradle halves 210 and 260 are operatively coupled to separate drive motors. In this embodiment, the positions of cradle halves 210 and 260 are independently adjustable in the x-direction. This feature provides additional capability of the apparatus 100 to accommodate books of varying sizes and properties. In particular, it renders the apparatus 100 more capable of accommodating book-to-book variation in spinal configuration when such books are placed in cradle assembly 200. Such book-to-book spinal variation results in variation of the foreshortening of book pages as the apparatus turns pages and proceeds through the text block of the book. Thus, the apparatus of the present invention can both properly image books that have significantly arched spines and books that have substantially flat spines.

A better understanding of the foreshortening of book pages is attained by reference to FIG. 1C and FIG. 3B. Referring to FIG. 3B, book 10 depicted therein comprises a spine 20, which is highly arched and substantially hinge-like proximate to page bifurcation 40. The resulting effect of such a hinge-like spine is that the edge 31 of the left text block is slightly angled, but nearly perpendicular to front cover 16, and the edge 33 of the right text block is slightly angled, but nearly perpendicular to back cover 17. Book 10 of FIG. 3B is thus considered to have a small amount of page foreshortening.

In contrast, refer now to FIG. 1C. Book 10 depicted therein also comprises a spine 20, which instead is substantially planar. The resulting effect of such a planar spine is that the edge 31 of the left text block is highly angled with respect to front cover 16, and the edge 33 of the right text block is highly angled with respect to back cover 17. Book 10 of FIG. 3B is thus considered to have a large amount of page foreshortening. It will be apparent that there is a need to detect the extent of page foreshortening during the imaging of a book, and adjust the imaging system as required in order to obtain complete images of each of the pages of such book. The manner in which the apparatus of the present invention addresses such a need is presented below.

Referring again to FIGS. 8A and 8B, respectively depicting a book held shortly after beginning page imaging and shortly before the end of page imaging, after the book is loaded in the cradle at the beginning of the book imaging process, the position of the first pair of open pages is adjusted by the operation of drive motors 220 and 270 so that the pair of open pages is properly located within the focal plane and field of view of the camera. The page imaging and page turning cycles (to be described subsequently) then proceed.

Early in the overall process, the thickness of the portion of text block beneath verso page 36 is small, and the thickness of the portion of text block beneath recto page 38 is large, as shown in FIG. 8A. As these page imaging and page turning cycles continue, the thickness of the portion of text block beneath verso page 36 increases, and the thickness of the portion of text block beneath recto page 38 decreases to a condition late in the process, shown in FIG. 8B. To properly locate the pair of open pages within the focal plane and field of view of the camera, the individual positions of left cradle half 210 and right cradle half 260 are adjusted as previously described, and as shown in FIGS. 8A and 8B. The x-positions of cradle halves 210 and 260 are also adjusted as described. Thus, throughout the page imaging process, the positions of verso page 36 and recto page 38 are adjusted in order to obtain a clear, complete, and focused image of each page.

In one embodiment of the present invention, optical sensing means are provided, to detect the position of the page bifurcation in order to more precisely control the positions of the verso and recto pages. Referring to FIGS. 8A and 8B, optical sensing means 255 is installed in substantially the position in which it is desired to maintain page bifurcation 40 during the page imaging process, in order to optimize the positions of verso page 36 and recto page 38. Thus, as the page imaging process proceeds, and the text block of book 10 undergoes a transition from FIG. 8A to FIG. 8B, optical sensing means 255 continuously detects the position of page bifurcation 40. The data from optical sensing means 255 is used by the apparatus controller (not shown) to adjust the drive motor, or motors (not shown), which control the x-positions of cradle halves 210 and 260. Accordingly, the positions of verso page 36 and recto page 38 are maintained in order to obtain a clear, complete, and focused image of each page.

In general, optical sensing means 255 "sees" in a direction substantially along the z-axis and parallel to page bifurcation 40. A variety of devices well known in the art are suitable as optical sensing means 255. In one embodiment, optical sensing means 255 comprises a photodiode on one side of the book, and a photodetector on the other side of the book. In a similar embodiment, optical sensing means 255 comprises an integrated photodiode and detector on one side of the book, and a reflector on the other side of the book. In each of these embodiments, the position of page bifurcation 40 is detected by the passage of a beam of light substantially congruent with page bifurcation 40; or, if page bifurcation is not in the desired position, the obstruction of the beam of light.

In an alternate embodiment, optical sensing means 255 comprises a camera, and image acquisition or machine vision hardware and software, such that the image of page bifurcation is recognized. In particular, the V-shaped discontinuity of page bifurcation 40 is recognized, and the image processing data, which digitally represents the shape and position of page bifurcation 40 is used by the apparatus controller (not shown) to adjust the drive motor, or motors (not shown), which control the x positions of cradle halves 210 and 260.

In general, optical sensing means 255 may be comprised of any combination of hardware, software, and computer controls, which are capable of sensing the V-shaped discontinuity of page bifurcation 40.

In a further embodiment, after the horizontal position of the cradle assembly and book supported therein is adjusted as desire, by the use of cradle drive motors, and/or page bifurcation sensing means, and/or page clamp assemblies (to be described subsequently in this specification), the horizontal position of the cradle assembly and book is fixed by engagement of a slide detent. Referring to FIG. 9B, slide trip plate 112 is operatively engaged with motor 180, such that the operation of motor 180 in forward and reverse directions effects the upward and downward movement of the end 113 of slide trip plate 112, as indicated by arrow 114.

The upper extremity (not shown) of the end 113 of slide trip plate 112 is operatively engaged with slide detent 115, such that the upward and downward motion of the end 113 of slide trip plate 112 produces a corresponding upward and downward motion of slide detent 115. In one embodiment (not shown), slide detent comprises an L-shaped piece having a horizontal surface as one leg of the L. When slide detent 115 is raised upwardly, this horizontal surface contacts a corresponding surface of base 297 of right cradle half 260 and/or base 247 of left cradle half 210 (See FIG. 8A).

Thus, when motor 180 operates to produce an upward motion of slide detent 115, slide detent 115 is engaged with and prevents motion of cradle assembly 200 and the book supported therein. It is noted that the operation of motor 180 is used for the dual purposes of engaging slide detent with cradle assembly 200, and deploying page clamp assembly 140 upon the book, to be subsequently described in this specification.

In a further embodiment, a book is further supported within the cradle assembly by the use of a spine cloth, which is suspended between the lower portions of each cradle half. During the imaging of a book, the spine cloth is in supportive contact with the spine of the book, such that the possibility of the book falling between the two cradle halves is eliminated.

Figure 18:
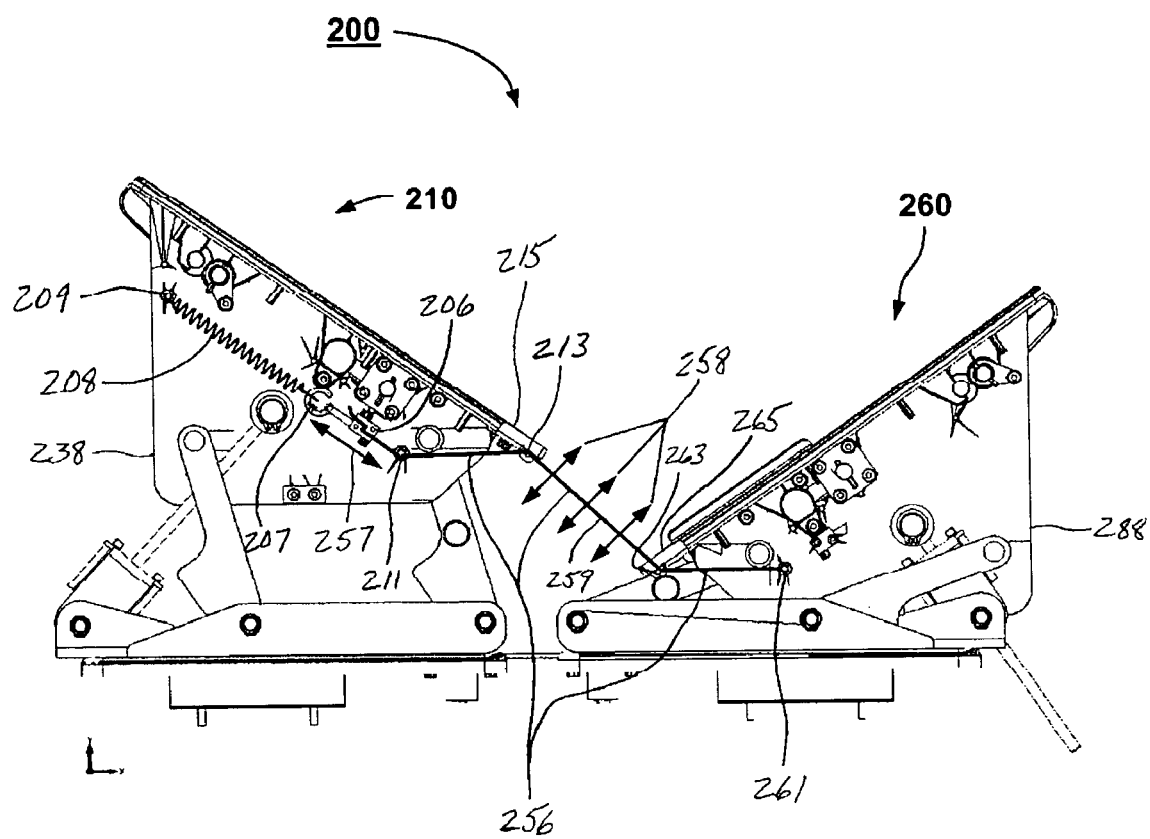
FIG. 18 is a sectional view of a cradle assembly of the apparatus of the present invention, taken at line 18-18 of FIG. 9B, further depicting the use of a spine cloth for supporting a book upon the cradle assembly.

FIG. 18 is a sectional view of a cradle assembly of the apparatus of the present invention, taken at line 18-18 of FIG. 9B. Referring to FIG. 18, spine cloth 256 is operatively joined at a first end to cylindrical shaped bar 261, which is supported at its back end by rear support plate 238, and at its front end by front support plate 230 (see FIGS. 6A and 6B). Spine cloth 256 is also joined at its second end to clamp 206.

Spine cloth 256 is further supported and routed through cradle halves 210 and 260 by additional members. Spine cloth 256 is routed over roll 263, across the space between cradle half 210 and cradle half 260, over roll 213, and beneath roll 211. Cylindrical shaped bar 211 is supported at its back end by rear support plate 238, and at its front end by front support plate 230 (see FIGS. 6A and 6B). Roll 213 is also cylindrical shaped, and supported at its back end by bracket 215, and at its front end by bracket 217 (see FIGS. 6A and 6B). In like manner, roll 263 is supported at its back end by bracket 265, and at its front end by bracket 267 (see FIG. 6B).

To provide a supporting force upon a book spine, tensioning means are provided, which pull spine cloth 256 taut against at least a portion of the spine of the book being imaged. Referring again to FIG. 18, and in one embodiment, tensioning means comprises a spring 208 connected at a first end to cylindrical bar 209, and at its opposite end to eyebolt 207, which is operatively connected to clamp 206. Cylindrical bar 209 is similarly supported by support plates 230 and 238, as recited previously for cylindrical bar 211. Spring 208 is preferably a wound wire or coil spring, and spring 208 is chosen to have dimensions and a force constant such that spine cloth 256 is placed in tension by the action of spring 208.

Thus, in the absence of a book being held in cradle assembly 200, spine cloth 256 forms a substantially planar surface in the span 259 between rolls 213 and 263 of cradle halves 210 and 260, respectively. However, when a book is present, spine cloth 256 is free to deform in the general direction indicated by arrows 258. Span 259 between rolls 213 and 263 lengthens accordingly, with the corresponding length change accommodated by the stretching of spring 208, as indicated by arrow 257. The tension of spine cloth 256 applies a force upon the book spine in substantially the opposite direction of that indicated by arrows 258.

FIGS. 8A and 8B depict the contact of spine cloth 256 with the spine 20 of book 10. In the embodiment depicted in FIGS. 8A and 8B, book 10 comprises a concave or arched spine, and only a small portion 21 of spine 20 is in contact with the span 259 of spine cloth 256. FIG. 8B further depicts the instance where book 10 comprises a convex spine 249, shown in dotted outline form. It will be apparent that in such an instance, span 259 would become congruent with convex spine 249, as a result of the tension upon spine cloth 256. It is noted that FIGS. 8A and 8B further illustrate that because spine cloth 256 comprises a flexible material, it maintains contact with book spine 20 of book 10, as the imaging process proceeds seriatim through the text block 30 of book 10.

It is to be understood that although in this specification the flexible web of material is described as spine cloth 256, there is no intent to limit the material selection of such web material to cloth. Such web may be formed from a variety of flexible sheet goods, such as leather, thin polymer film, polymer netting, sheet rubber, materials with such coating thereon and the like, with the operative requirement being that when the flexible web is put in tension, it conforms to and provides a supporting force upon at least a portion of book spine 20, such that book 10 is further supported in cradle assembly 200.

Page Clamps

Prior to acquisition of images for each pair of open pages, such pages may be further precisely positioned for imaging by forcing them to take the shape of substantially planar surfaces. As was previously described, and depicted in FIGS. 3A and 3B, the use of clamps at the page bifurcation provides a suitable means of flattening the open pages into substantially planar surfaces. In one embodiment of the present invention, such clamps are provided. Such clamps are believed to preferably be automatically deployed during each page imaging cycle, but retracted when the pages are being turned so as not to interfere with the pages or page turning mechanisms.

Figure 10A:
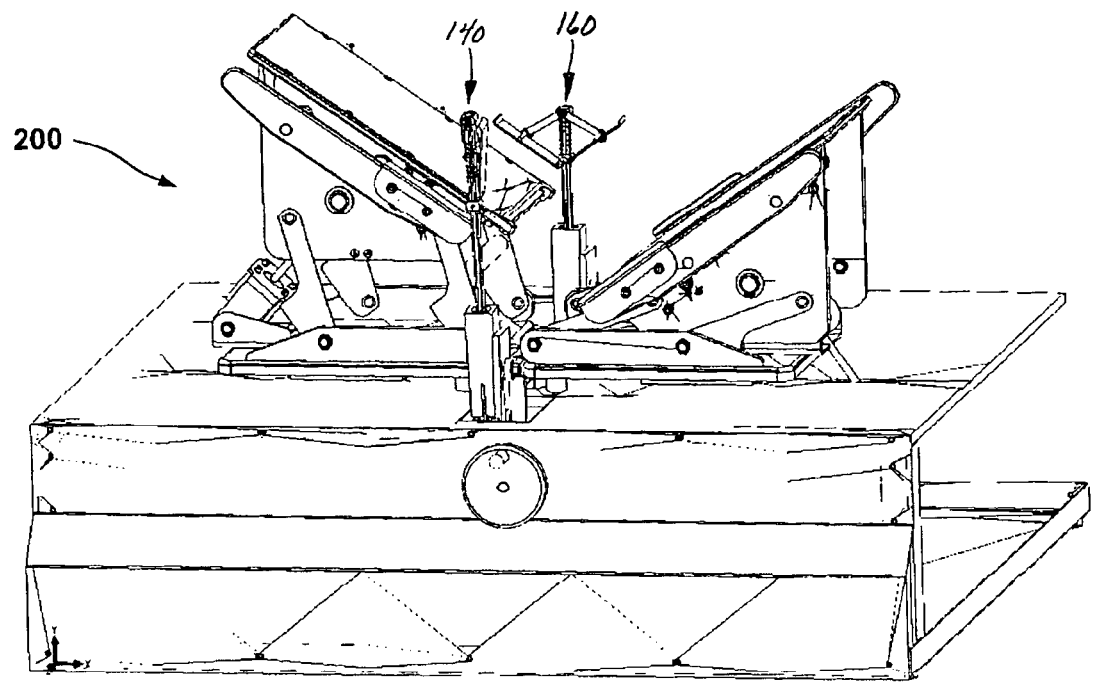
FIG. 10A is a perspective view of the cradle assembly of the present invention, further depicting page clamps for flattening the open pages prior to page imaging.

FIG. 10A is a perspective view of the cradle assembly of the present invention, further depicting page clamps for flattening the open pages prior to page imaging. Referring to FIG. 10A, the apparatus of the present invention is provided with a front clamp assembly 140 and a rear clamp assembly 160. It is to be noted that for illustrative purposes in FIG. 10A, front clamp assembly 140 is shown in a retracted state, and rear clamp 160 assembly is shown in a deployed state. However, in operation of the apparatus, clamp assemblies 140 and 160 are typically deployed together to flatten the pages of a book, and released together to release the pages of a book.

Figure 10B:
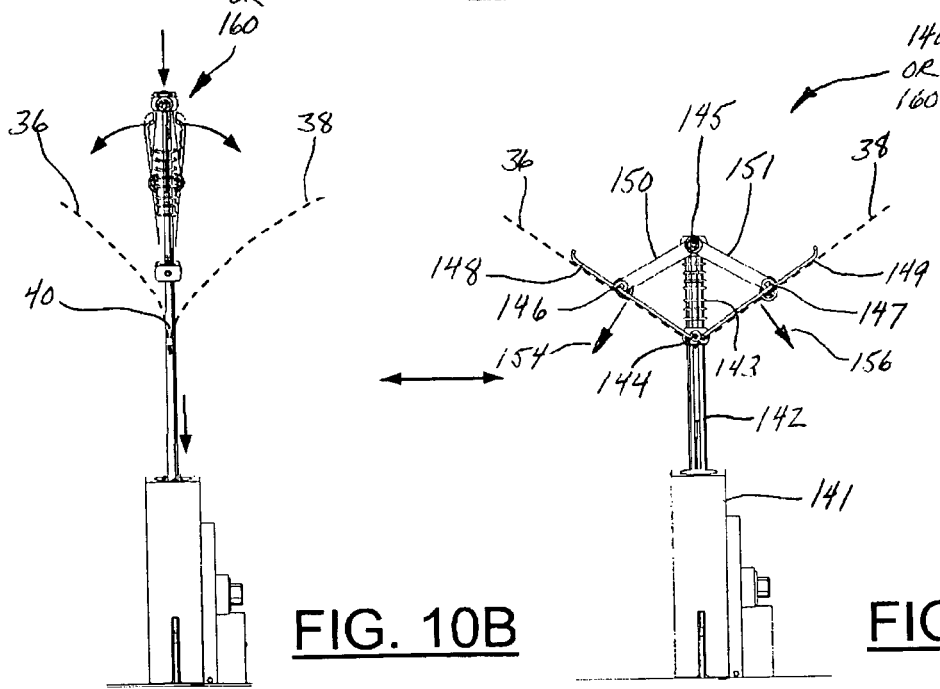
FIGS. 10B and 10C are elevation views of a page clamp in the released position, and the deployed position, respectively.
Figure 10C:
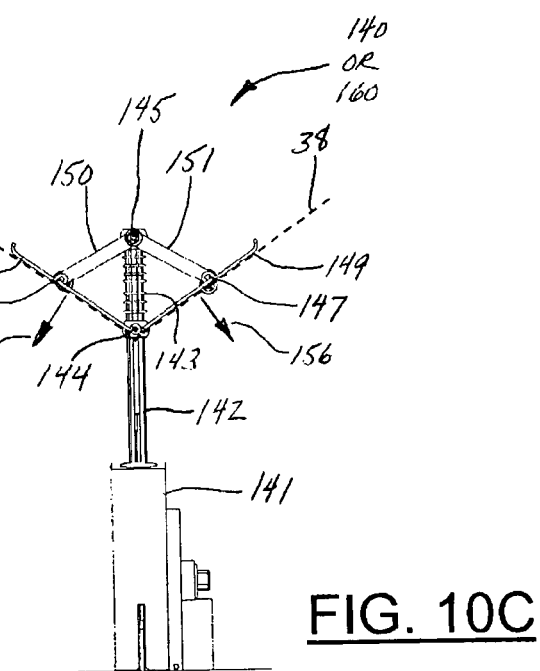

FIGS. 10B and 10C are elevation views of a page clamp in the released position, and the deployed position, respectively. Referring to FIG. 10C, page clamp assembly 140/160 comprises pivot block 141, pull rod 142, spring 143, pins 144 and 145, pivot lugs 146 and 147, spreaders 148 and 149, and links 150 and 151. In operation, the retracted clamp assembly 140/160 of FIG. 10B is pulled downwardly by pull rod 142 towards page bifurcation 40, located between verso page 36 and recto page 38 (shown as dotted lines). Because links 150 and 151 are pivotally joined to pull rod 142 by pin 145, and to spreaders 148 and 149 by pivot lugs 146 and 147 respectively, and spreaders 148 and 149 are pivotably and slidably joined to pull rod 142, the downward movement of clamp assembly 140/160 deploys spreader 148 against verso page 36 and spreader 149 against recto page 38. Spring 143 provides through the linked mechanism a substantially normal force of spreaders 148 and 149 against verso page 36 and recto page 38, indicated by arrows 154 and 156 respectively. As a result of such forces, page bifurcation 40 is spread open, and verso page 36 and recto page 38 are flattened into substantially planar surfaces, and thereby made ready for image acquisition. For further illustration, FIG. 11A depicts a book held by the cradle assembly, with page clamp assemblies 140/160 in the released position; and FIG. 11B depicts a book held by the cradle assembly with page clamp assemblies in the deployed position.

At the beginning of the book imaging process, the position of page clamp assemblies 140 and 160 are adjusted to place them in proper position relative to the height of the book. FIG. 9B is a side elevation view, which depicts means for making such an adjustment of page clamp assemblies 140 and 160. Referring to FIG. 9B, cradle assembly 200, which holds a book (not shown), is mounted upon base 110. Lead screw mechanism 120 is mounted to base 110, upon the underside thereof, and above floor pan 116. Lead screw mechanism 120 comprises an adjustment knob 122, and a shaft 124 having a first portion 126 comprising left hand threads, and a second portion 128 comprising right hand threads. Shaft 124 is threadedly engaged with left hand lead screw nut 130, which is suitably joined to front support plate 134. Shaft 124 is also threadedly engaged with right hand lead screw nut 132, which is suitably joined to rear support plate 136. Front clamp assembly 140 is pivotably joined to front support plate 134 at pivot block 141, and rear clamp assembly 160 is pivotably joined to rear support plate 136 at pivot block 161. Accordingly, when adjustment knob 122 is turned clockwise, front clamp assembly 140 and rear clamp assembly 160 are moved away from each other, and when adjustment knob 122 is turned counterclockwise (See FIG. 9A), front clamp assembly 140 and rear clamp assembly 160 are moved toward from each other. Thus, at the beginning of a book imaging process, clamp assemblies 140 and 160 are separated from each other sufficiently to allow the book to be loaded onto cradle assembly 200. Subsequently, adjustment knob 122 is turned to bring clamp assemblies proximate to the book, so that they will engage and flatten the pages in order to obtain satisfactory page images as previously described.

During each imaging cycle, i.e. the acquisition of images of verso and recto pages, clamp assemblies 140 and 160 are deployed as previously described herein. During each page turning cycle, clamp assemblies 140 and 160 are retracted, so that the next leaf is free to be turned. Clamp assemblies move upwardly during retraction, as indicated by the transition from FIG. 10C to FIG. 10B. However, in order to provide sufficient clearance for a page to be turned, the step of clamp assembly retraction preferably comprises vertical retraction upwardly from the page bifurcation, and horizontal retraction outwardly relative to the top and bottom edges of the book. The apparatus of the present invention provides clamp assemblies with such capability, which is now described.

Referring again to FIG. 9B, it is first noted that for illustrative purposes, clamp assembly 140 is shown in the retracted position, and clamp assembly 160 is shown in the deployed position. However in the operation of the apparatus, clamp assemblies 140 and 160 are deployed together in the position of clamp assembly 160 during the imaging cycle, and clamp assemblies 140 and 160 are retracted together in the position of clamp assembly 140 during the page turning cycle. It can be seen that clamp assembly 140, in the retracted position, has been horizontally retracted outwardly by a pivoting motion indicated by arcuate arrow 158 around pivot bolt 152. In like manner, clamp assembly 160 is horizontally retracted to an analogous location when in its retracted position.

To accomplish deployment and retraction, clamp assembly 140 is driven by drive motor 180. Drive motor 180 is suitably mounted upon cam front support plate 182. The shaft (not shown) of drive motor 180 is suitably operatively connected to a clamp drive lug (not shown), which comprises a lever arm. Said clamp drive lug is further connected to a clamp spring link (not shown), which in turn is connected to pull rod 142. When drive motor 180 is rotated clockwise (with respect to the view of FIG. 9B), said clamp spring link produces a downward motion of pull rod 142, and a rotational motion of pivot block 141 around the axis of pivot bolt 152. Accordingly, clamp assembly 140 is moved to the deployed position previously described and shown by clamp assembly 160 of FIG. 9B. When drive motor 180 is rotated counterclockwise (with respect to the view of FIG. 9B), said clamp spring link produces a upward motion of pull rod 142, and a rotational motion of pivot block 141 around the axis of pivot bolt 152. Accordingly, clamp assembly 140 is moved to the retraced position previously described and shown by clamp assembly 140 of FIG. 9B. The deployment and retraction of clamp assembly 160 is accomplished by drive motor 190 in substantially the same manner, with a mechanism that is the mirror image of that described herein for clamp assembly 140.

In one embodiment, the action of deploying the clamp assembly to secure and flatten the open pages of the book is also used to locate the book in the desired position in the x-direction beneath the optical assembly, so that the desired page images are recorded. Referring to FIGS. 11A and 11B, when the deployment of page clamp assemblies 140 and 160 occurs, page clamp assemblies 140 and 160 are driven downwardly into page bifurcation 40 of book 10. Spreaders 148 and 149 of clamp assembly 140, and spreaders 168 and 169 of clamp assembly 160 engage verso page 36 and recto page 38 of book 10. Book 10, being supported upon slidably mounted cradle assembly 200 as indicated by arrow 205, will be forced to move in the x-direction such that the page bifurcation is in alignment with clamp pull rods 142 and 162 of clamps 140 and 160, respectively. In this manner, book 10 is always located during the imaging process such that page bifurcation 40, verso page 36, and recto page 38 are in a fixed position with respect to optical assembly 300 (see FIG. 4B). Accordingly, the desired images of verso page 36 and recto page 38 are consistently obtained as the apparatus acquires the page images seriatim.

It is noted that in the operations recited above, the operation of motor 180, which deploys page clamp assembly 140, also serves the function of engaging slide detent 115 with cradle assembly 200 in order to prevent further horizontal motion of cradle assembly 200 during the imaging process, as described previously in this specification and shown in FIG. 9B.

Optical Assembly

FIGS. 12A and 12B are a perspective view and an elevation view, respectively, of an optical assembly, which is used in the present invention to acquire images of the open pages of a book. Although described herein as a still image camera suitable for capturing a high-resolution visual image, it will be appreciated that a closed-circuit television or similar real-time camera and associated recording means or display may be employed as well. Such a system may be used to assist the visually and physically impaired in reading books and other bound documents.

Referring to FIGS. 12A and 12B, optical assembly 300 comprises a frame 301 (not shown; see FIG. 4A), camera 302, lens 304, camera support 306, flip mirror assembly 310, recto page mirror assembly 320, verso page mirror assembly 330, left lamp assembly 340, right lamp assembly 350, front lamp assembly (not shown), rear lamp assembly (not shown), recto page ultrasonic position sensor 382 and verso page ultrasonic position sensor 384. Lighting is provided via high-frequency fluorescent lamps, which are positioned at least at the front and back relative to the cradle. Moreover, in order to assure proper illumination on various book sizes (page heights), and to reduce glare from glossy page surfaces, the front and rear lighting positions are preferably adjustable. The lighting system apparatus 100 is preferably part of the optics system 300. Front and rear lights are associated with frame 301, and are supported by a pair of parallel slides, where the slides are connected so as to cause the rear light position to move when the front light position is changed (e.g., one set of slides has linear teeth along its surface and is interconnected by a common gear, such that movement of one slide is automatically translated to the other; pulling the front light outward causes the rear light to move backward and vice-versa).

FIG. 12B further depicts book 10 comprising verso page 36 and recto page 38, held in cradle 200 with said verso and recto pages flattened into substantially planar surfaces by clamp assemblies (not shown), as previously described. For illustrative purposes, the projection of the image of recto page 38 by recto page mirror assembly 320 and flip mirror assembly 310 to camera lens 304 is shown by dotted lines in FIG. 12B. Referring to FIGS. 12A and 12B, recto page mirror assembly comprises frame 322, and mirror 324. Flip mirror assembly comprises mirror 312. In recording the image of recto page 38, said image is reflected by recto page mirror to flip mirror 312. Flip mirror 312 reflects said image to camera lens 304, which focuses said image within camera 302 preferably upon a charge coupled device (CCD) image receptor (not shown), or upon silver halide camera film (not shown), microfilm, or upon other suitable image recording medium.

Flip mirror 312 is mounted upon base 313 and is pivotable, as indicated by 20 arcuate arrow 311. In the recording of verso page 36, flip mirror 312 is rotated clockwise approximately 90 degrees by the operation of motor 314, such that the image of verso page 36 is reflected by verso page mirror 332 to flip mirror 312, and subsequently to camera lens 304, as previously described for recto page 38.

Flip mirror assembly 310 further comprises ultrasonic sensors for detecting the positions of verso page 36 and recto page 38. (see sensor configuration described above) Referring again to FIGS. 12A and 12B, recto page ultrasonic sensor 382 and verso page ultrasonic sensor 384 are suitably mounted by support brackets 386 and 388, respectively, to flip mirror assembly 310. Recto page ultrasonic sensor 382 directs ultrasound (not shown) to recto page mirror 324, which reflects said ultrasound to recto page 38. Said ultrasound is reflected back by recto page 38 to recto page mirror 324, and subsequently to recto page ultrasonic sensor 382. Signal processing means (not shown), which are suitably connected to ultrasonic sensor 382 by shielded cable (not shown) or by wireless transmission (not shown), analyze and compare the ultrasound that is transmitted and received by sensor 382, and determine the distance between recto page 38 and recto page mirror 324. In each page turning and imaging cycle, this distance is compared to the distance required for recto page 38 to be in the focal plane of camera 302, in order to obtain a clear, focused image of recto page 38. If these distances differ by more than a specified amount, a programmable controller (not shown) operates motor 270, which rotates shaft 272, thereby adjusting the position of right cradle half 260 and recto page 38, as previously described in this specification. It will be apparent that the measurement and control of the position of verso page 36 is accomplished by substantially the same procedure, by the use of verso page ultrasonic sensor 384, and drive motor 220.

It will be apparent that many position sensing devices, other than those employing ultrasound, are known, and would be suitable as position sensing means in the present invention. For example, position sensing means utilizing infrared light would be suitable. Position sensing means comprising intersecting beams of light, wherein the position of the intersection is detected would also be suitable.

Optical system 300 preferably has the additional capability to adjust its image acquisition function to accommodate books of varying page sizes. It will be apparent that a large book, i.e. a book that has a large page height and width, will require a larger field of view of the camera in order to properly record its page images, compared to a small book. Thus the camera 302 and lens 304 of FIGS. 12A and 12B are provided with the capability to zoom in and out or otherwise adjust the image area, in order to capture the full page images across a range of book sizes. However, the positions of flip mirror 312 in verso and recto page imaging must be adjusted to properly match the chosen amount of zoom. The use of a single recto imaging position and a single verso imaging position will not properly reflect the verso and recto page images to camera lens 304 across the full range of zoom positions that is required to image a variety of book sizes.

Accordingly, in the present invention, the position of flip mirror 312 is adjusted in order to properly reflect verso and recto page images to camera lens 304. In one embodiment, seven different zoom positions are utilized by lens 304, in order to accommodate book pages of varying size. The relative angular positions of flip mirror 312 for verso page and recto page imaging versus book width setting are provided in the table below. Other embodiments comprising more or fewer sizes, and different flip mirror angular positions, which reflect the complete images of recto and verso pages to camera 304 are also within the scope of this invention.

| | FLIP MIRROR POSITIONS (DEGREES FROM A REFERENCE ANGLE DEFINED AS ZERO) | |
|---|---|---|
| Book Width | Left Angle Setting | Right Angle Setting |
| 5 inches | −48.5 degrees | 46 degrees |
| 6 | −47 | 44 |
| 7 | −46 | 43 |
| 8 | −45.5 | 42.5 |
| 9 | −45 | 42 |
| 10 | −45 | 42 |

In an alternative embodiment, depicted in FIG. 22, the images of the verso and recto pages are simultaneously directed to the camera (or other image acquisition means, such as a high resolution line scanner) by optical means other than a flip mirror. Referring to FIG. 22, and in one preferred embodiment, such optical means comprises a reflective prism 360, which is mounted upon base 313. Reflective prism 360 comprises a reflective verso face 364 and a reflective recto face 362.

In this embodiment, each pair of verso and recto pages are imaged simultaneously, wherein the image of verso page 36 is reflected from verso page mirror 334 to reflective verso face 364 of prism 360, and on to camera lens 304; while the image of recto page 38 is reflected from recto page mirror 324 to reflective recto face 362 of prism 360, and on to camera lens 304. Such an embodiment has the advantage of a significantly higher throughput in the imaging of a book.

In an alternative embodiment (not shown), a pair of mirrors is used instead of prism 360, wherein a first mirror is placed in substantially the same position as verso face 364 of prism 360, and a second mirror is placed in substantially the same position as recto face 362 of prism 360. It will be apparent that numerous other optical devices are known, such as lenses, prisms, gratings, and combinations thereof, which may serve as optical means to sequentially or simultaneously deliver the images of the verso and recto pages to camera lens 304.

In yet another alternative embodiment (not shown), a pair of cameras may be used to simultaneously acquire the page images, wherein a first camera acquires the verso page image, and a second camera acquires the recto page image.

Page Turning Assembly

The apparatus of the present invention further provides an assembly for turning each page of a book, so that the apparatus can rapidly and automatically image all of the pages without manual intervention. As previously stated herein, the act of turning a page forward is defined as the sequence of contacting and grasping or acquiring with fingers, or some apparatus, a leaf comprising a recto page, and pivotally rotating said page about its bound edge, until the surface of said page is in contact with the surface of the former verso page, and the exposed surface of the rotated leaf is the new verso page. In the preferred embodiment of the present invention, pages are turned forward, so that page images are acquired sequentially, beginning at the front of a book, and ending at the back of a book.

Figure 13A:
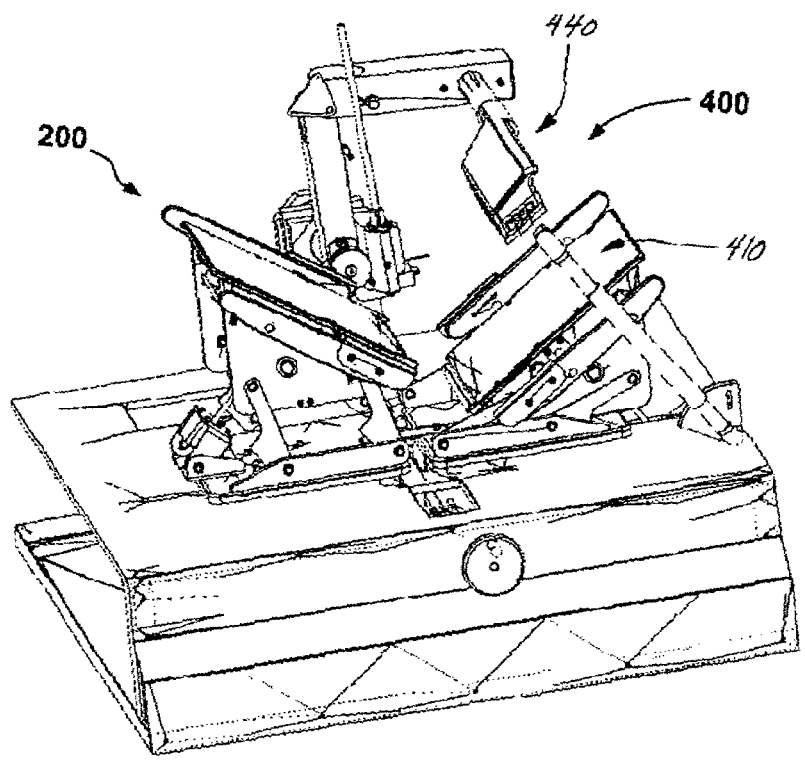
FIG. 13A is a perspective view of part of the apparatus of the present invention, further depicting a cradle assembly, a page fluffing assembly, and a page turning assembly.
Figure 13B:
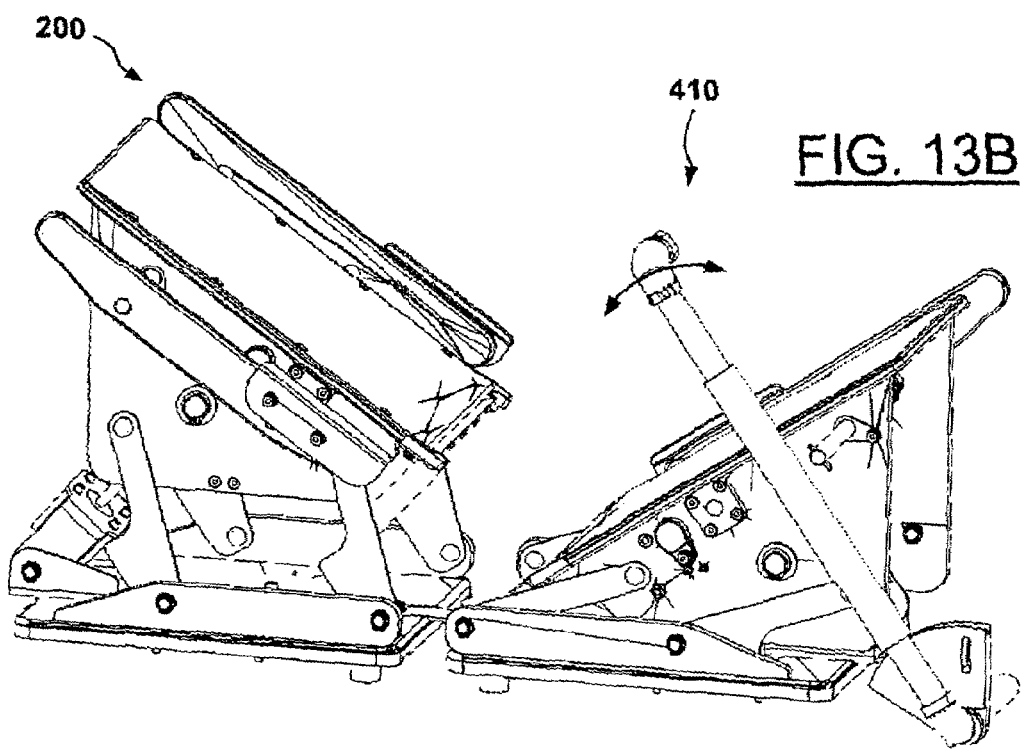
FIG. 13B is a perspective view of part of the apparatus of the present invention, further depicting a cradle assembly, and a page fluffing assembly.

FIGS. 13A and 13B are perspective views of part of the apparatus of the present invention, further depicting a cradle assembly 200, and a page turning assembly. Page turning assembly 400 preferably comprises a page fluffer 410 and a page turner 440. Immediately after the completion of an imaging cycle, i.e. after images of the pair of open pages are acquired, page fluffer 410 separates the leaf comprising the recto page, and page turner temporarily attaches to the upper surface of the leaf and turns the page, thereby producing a new verso page and new recto page to be imaged.

Figure 13C:
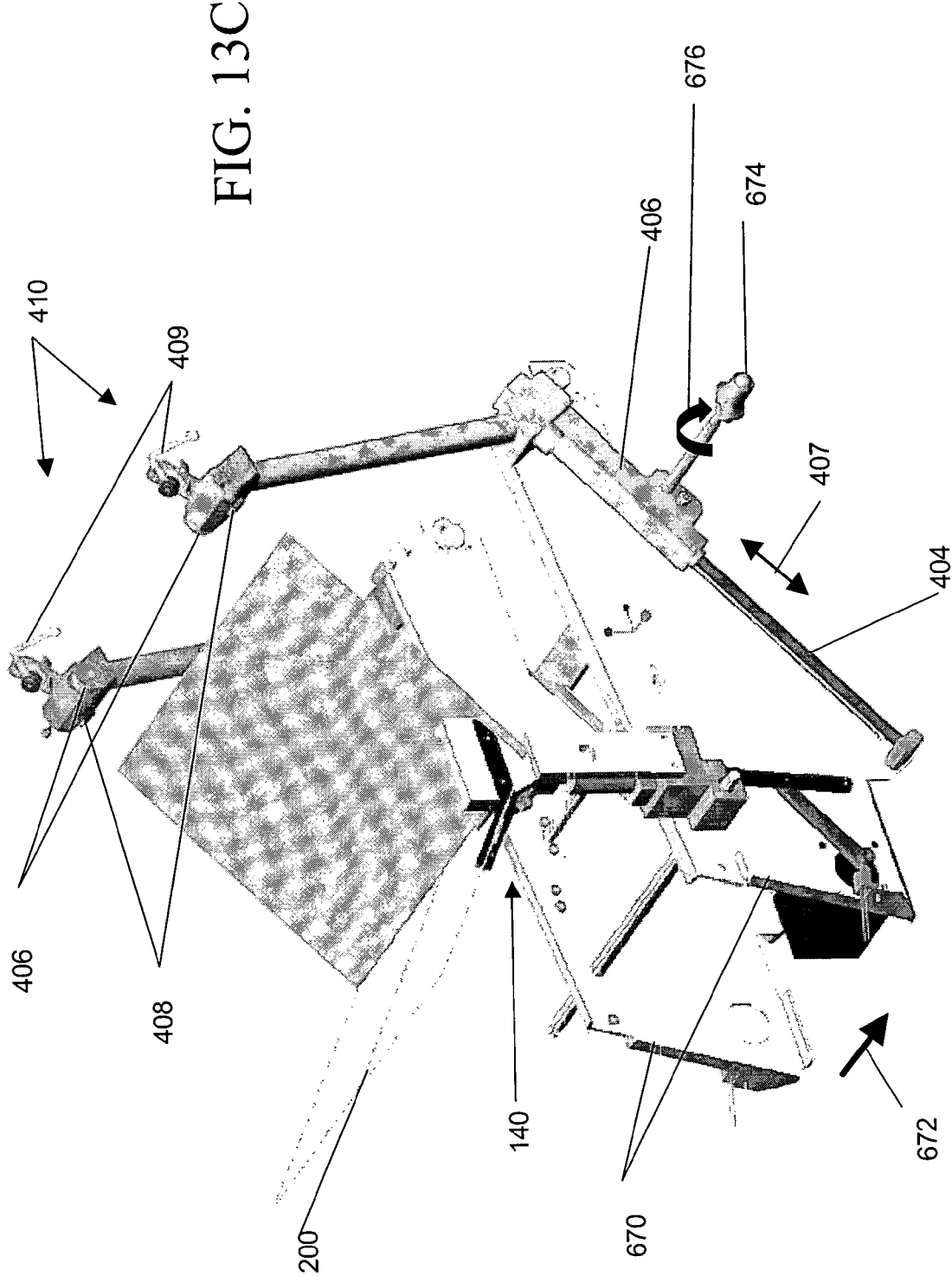
FIG. 13C is a perspective view of part of the apparatus of the present invention, further depicting an alternative embodiment of a cradle support assembly, a clamp assembly, and the page fluffing assembly.

Referring also to FIG. 13C, there is depicted an alternative embodiment for the cradle, page fluffing and clamping assemblies. In particular, the alternative embodiment includes a pair of page fluffers 410, positioned adjacent to the front and rear edges of the recto leaf. Also associated with the head or end of page fluffers 410 are two additional components—page level sensors 408 and retard fingers 409. Page level sensors 408 are preferably photoelectric sensors such as SUNX CX-23 sensors, wherein beams of light are sent from a rear-mounted emitter to a front-mounted detector so that the level or position of the recto page may be detected. In an alternative embodiment, the sensors may be reflective type sensors, where the emitter and detector are co-located. Similar sensors may be provided for the verso page (not shown) and are preferably mounted in association with the clamp or similar device positioned adjacent the verso leaf. In one embodiment of the present invention, one or more retard fingers 409 may be used to hold the right-hand or recto page down as the top page is being turned. In the figure, the front retard finger is shown in a withdrawn or retracted position, whereas the rear retard finger is shown in an operative position, where it would serve to prevent the page from turning.

As will be appreciated from a review of FIG. 13C, the fluffer assembly 410 is mounted on a slide 406 to enable its position adjustment for page width, by moving the fluffers in the direction of arrow 407 along shaft 404, preferably at the time a book is loaded. Although the details of the rear fluffer mounting mechanism are not illustrated, it will be appreciated that similar mechanism may be employed for the front and rear fluffer assemblies in the embodiment of FIG. 13C.

FIG. 13C also shows that the fluffers 410 and clamp assemblies 140 and 160 are, respectively, located on common structures 670. Structures 670 are further able to translate or adjust relative to one another, in direction 672 in response to the rotation of a screw-shaft 674 in the direction indicated by arrow 676. The screw-shaft may be equipped with a crank (not shown) to provide such translation and allow a user to adjust the fluffers and clamps for different height books. By mounting the front and rear fluffer and clamp assemblies on common structures, the position of each assembly is controlled by a single adjustment.

In FIG. 13C, front clamping mechanism 140 is also preferably a pivotable mechanism that, once unlocked, is able to be tilted out of the way (pivots/tilts downward) in order to facilitate loading of a book from the front of the apparatus. Furthermore, when a page is clamped by the clamping mechanism, the spreaders 148 and 149 (e.g., FIG. 10C), are placed on the margins of the pages to hold them in position for imaging. In one embodiment, the top surface of spreaders 148 and 149 are painted a particular color or pattern that can be easily recognized by image processing software receiving and operating on an image generated by the camera. In this way, the software may operate on a page image in order to automatically "remove" the spreaders from the image (margins), preferably replacing the spreader with an image color similar to a non-clamped margin region. Having described various embodiments of the page fluffers and page turner, the operations of page fluffer 410 and page turner 440 are now presented in detail.

As described herein, various operations of the present invention may be accomplished by a programmable controller, preferably in response to inputs, which may include sensor signals. For example, sensing means such as the sensors described above, or similar optical sensors (e.g., reflective sensors) suitable for detecting one or more page edges, may be used to detect the location of the open pages of the book or document. Sensors of this type may be further employed to indicate the boundary of at least one edge of a page, and the signal from said sensor may be employed by the controller to automatically indicate and/or output the location of the edge so as to control cropping of an image produced by the camera. It will be further appreciated that such sensors, or the optical imaging camera, may be further employed to sense a page inserted (e.g., colored page or page having a particular pattern) or a tab attached to an existing page, or an equivalent material that extends beyond a page edge. Upon detection of such a material (e.g., insert or tab), the sensor may be used to signal the controller in response to the sensing of the material, thereby causing the controller to alter an operational cycle of the apparatus. For example, the signal may be used to stop operation entirely, to alter the operation by skipping pages until another insert or tab is detected, or to alter the scanning/imaging parameters (e.g., to scan at a different resolution because images are found on the tabbed pages). In yet a further modification of the sensors, they may be used to sense the opacity of pages that are acquired. In this way, the typical page opacity may be determined and any opacity (occlusion) of a greater level may be determined to be acquisition of multiple pages by the vacuum head—thereby requiring that operation stop for manual intervention, or that the process otherwise be altered to assure that the pages are separated before proceeding (e.g., fluffers are engaged, re-engaged, etc.). It will be appreciated that this function may be accomplished by an optical sensor in conjunction with the controller. wherein the sensing means is capable of sensing the opacity of the page acquired by the vacuum head and providing a signal indicating the opacity to the controller, and where the controller determines if multiple pages have been acquired by the vacuum head as a function of the opacity signal.

Figure 14A:
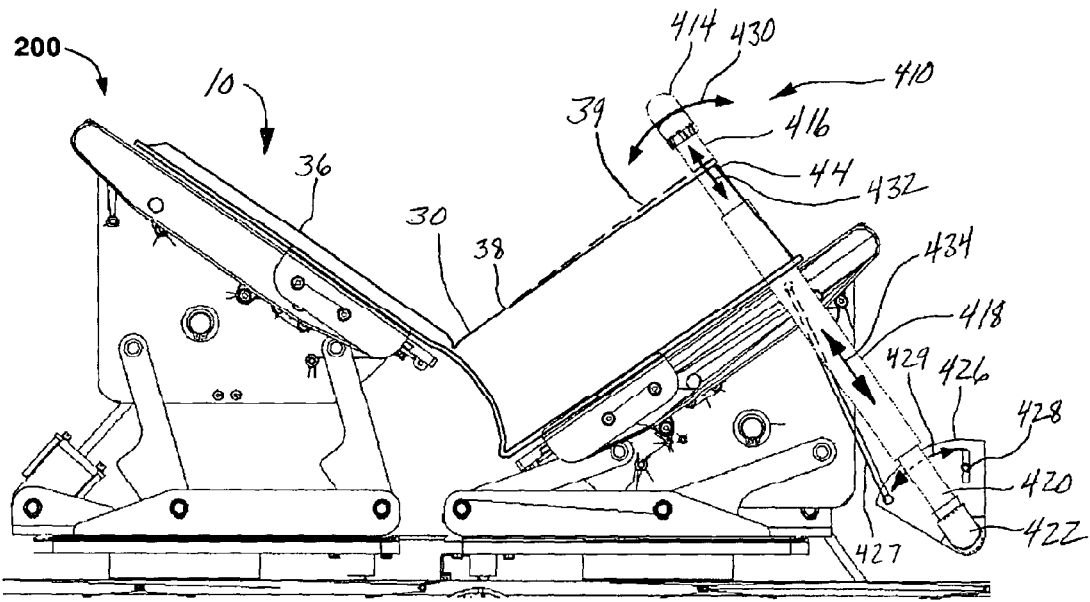
FIG. 14A is a front elevation view of a cradle assembly and a page fluffer of the apparatus of the present invention, further depicting a book held by the cradle assembly.
Figure 14B:
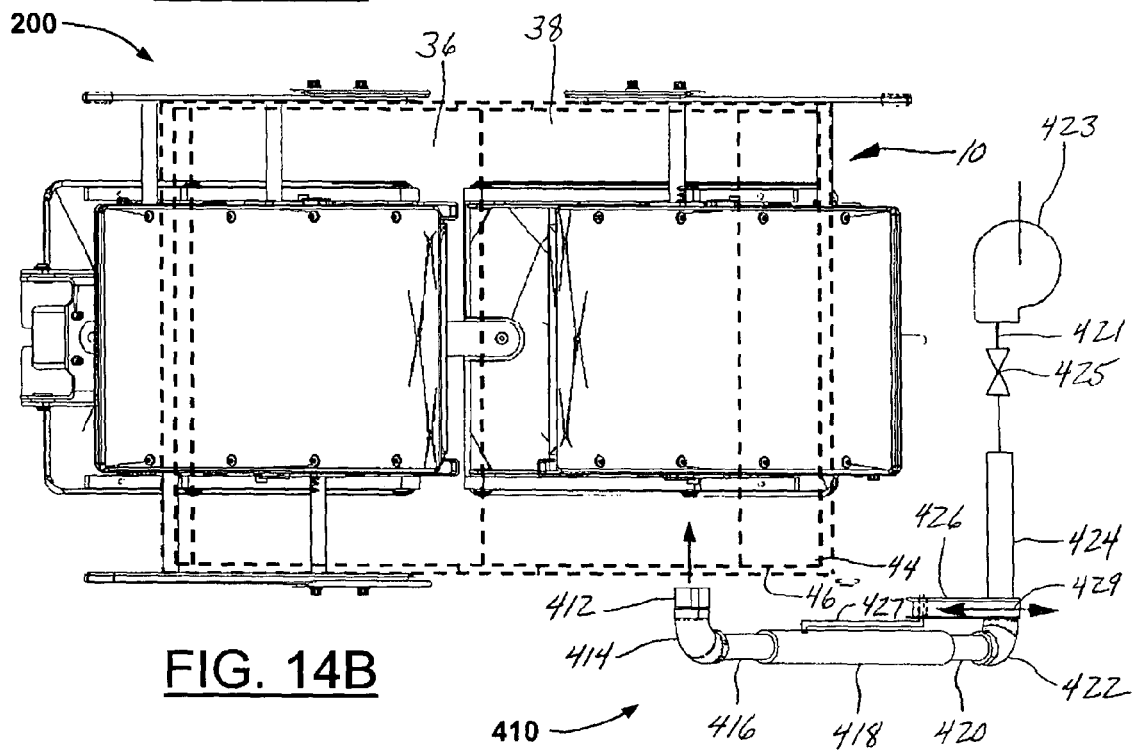
FIG. 14B is a top view of the cradle assembly and page fluffing assembly of FIG. 14A.

FIG. 14A is a front elevation view of a cradle assembly and a page fluffer of the apparatus of the present invention, further depicting a book held by the cradle assembly. FIG. 14B is a top view of the cradle assembly and page fluffing assembly of FIG. 14A. Referring to FIGS. 14A and 14B, fluffer 410 comprises nozzle 412, upper elbow 414, upper supply pipe 416, outer supply pipe 418, lower supply pipe 420, lower elbow 422, pivot pipe 424, pulley support 426, and air (gas) supply piping 421 (shown schematically), which is operatively connected to pivot pipe 424, to valve 425 (shown schematically), and to air supply blower 423 (shown schematically). Pivot pipe 424 is pivotably joined to pulley support 426, such that fluffer 410 may be pivoted about the central axis of pivot pipe 424, as indicated by arcuate arrow 430.

The outer diameters of upper supply pipe 416 and lower supply pipe 420 are slightly larger than the inner diameter of outer supply pipe 418, such that upper supply pipe 416 and lower supply pipe 420 are slidably engaged within outer supply pipe 418. Accordingly, the position of nozzle 412 may be adjusted relative to book 10 by motions of upper supply pipe 416 and outer supply pipe 418 along their common central axis, as indicated by arrows 432 and 434, respectively.

Such adjustment is accomplished by the rotation of pulley support 426, which is actuated by fluffer orienting rod 428. When pulley support 426 is rotated by the operation of fluffer orienting rod 428 around pivot pipe 424, as indicated by arrow 426 of FIGS. 14A and 14B, linkage rod 427, which is operatively joined to pulley support 426 and to outer supply pipe 418 is actuated in the general direction of arrow 434, resulting in the sliding of outer supply pipe 418 upon lower supply pipe 420. Thus the position of fluffer nozzle 412 with respect to book 10 is rendered adjustable.

In operation of fluffer 410, at the beginning of a book imaging cycle, the position of nozzle 412 is adjusted such that it is proximate to the corner 44 of the text block 30 of book 10. Immediately after each imaging cycle thereafter, page fluffer 410 separates the leaf comprising the recto page 38 from the remainder of the text block beneath recto page 38, by directing a jet of fluffing air toward the corner 44 of book 10 in a direction substantially perpendicular to the edge 46 of text block 30. Said fluffing air is preferably provided by a air supply blower 423, and started and stopped by operation of valve 425 (shown schematically in FIG. 14B). Said fluffing air is typically ambient air, although the air may also be treated for humidity or other characteristics to improve operability.

In one embodiment, said fluffing air consists essentially of dry compressed air. In yet another embodiment, wherein book 10 is a rare and delicate book, the apparatus of the present invention may be enclosed in a chamber filled with inert gas, and the fluffing gas may also consist essentially of an inert gas, such as nitrogen, argon, and the like.

The direction of a jet of fluffing air at the corner 44 of text block 30 results in recto page 38 being separated from the adjacent pages beneath recto page 38, as indicated by fluffed leaf 39 shown in dotted line format in FIG. 14A. Such separation facilitates the attachment of page turner 440 to fluffed leaf 39, prior to page turning.

Alternative embodiments of the present invention are directed to the use of adaptive air fluffers for separating a leaf comprising a page to be turned from the text block therebeneath. patent application Ser. No. 10/389,051 of Belkhir, discloses a page turning apparatus for turning at least a top page of a stack of pages in a book, comprising means for holding the book; an air plenum, positioned above the top page, for picking up the page when a vacuum is applied to said plenum; and a paper fluffer for blowing air between individual pages of the book, said paper fluffer including means for adjusting air flow between individual pages, said paper fluffer having a venturi plate portion in contact with at least one edge of the page, and said paper fluffer including a regulating plate portion with an aperture defined therein that permits air to go through and a cross-sectional area that limits air flow as the top page moves in contact with said air plenum. The use of such a paper fluffer is to be considered within the scope of the present invention.

Figures 15A, 15B:
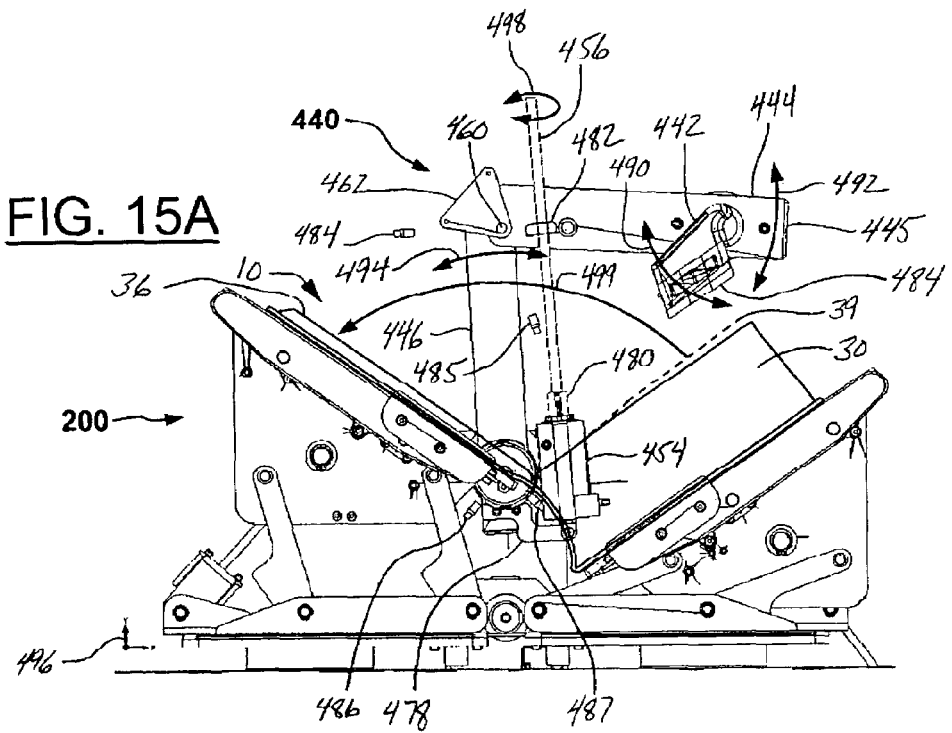
FIG. 15A is a front elevation view of a cradle assembly and a page turner of the apparatus of the present invention, further depicting a book held by the cradle assembly.
FIG. 15B is a right front perspective view of a cradle assembly and a page turner of the apparatus of the present invention.
Figure 16A:
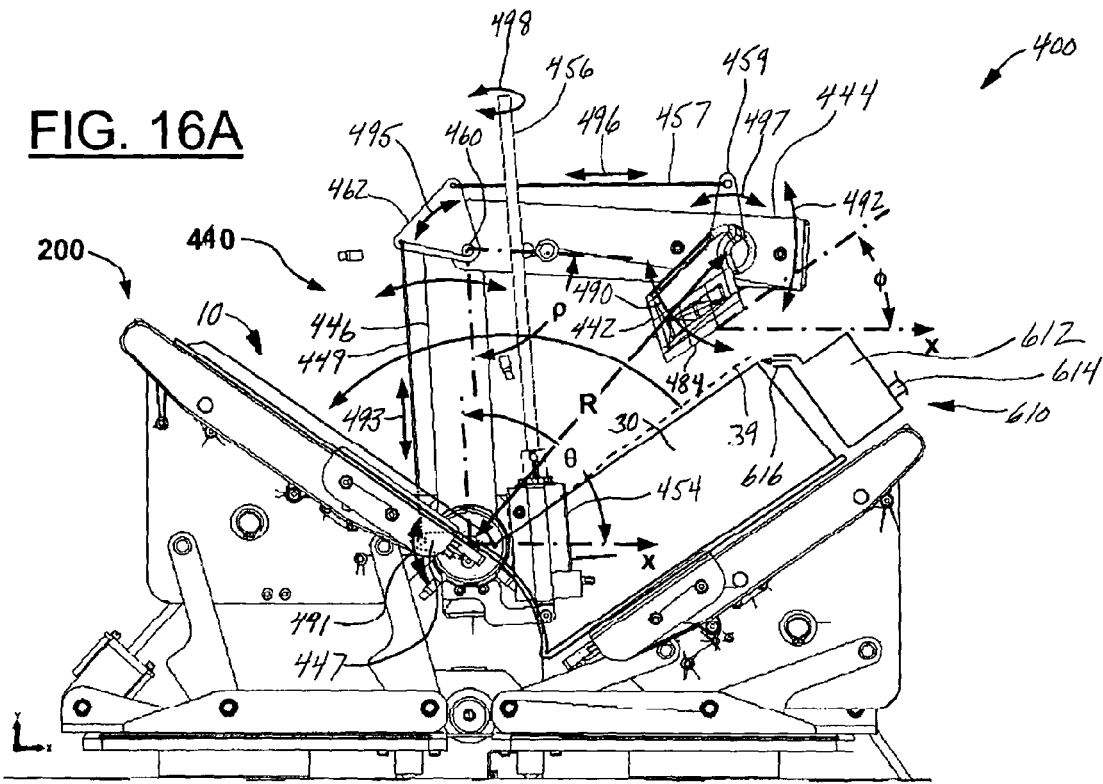
FIG. 16A is a front elevation view of a cradle assembly and a page turner, depicting the geometric relationships between components thereof, and also depicting an air knife in the page turning assembly.
Figure 19:
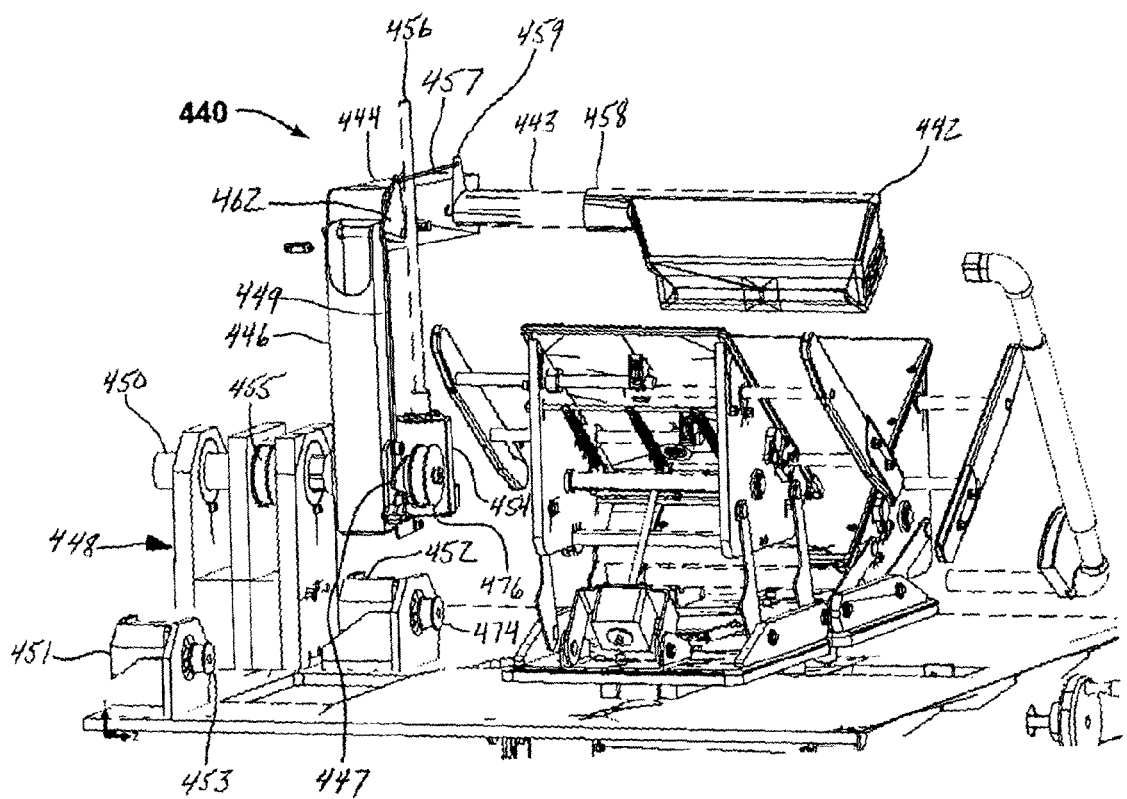
FIG. 19 is a left front perspective view of a cradle assembly and a page turner of the apparatus of the present invention.

Following the fluffing of verso page 38 to produce fluffed leaf 39, the page is turned. FIG. 15A is an elevation view of a cradle assembly and a page turner of the apparatus of the present invention, further depicting a book held by the cradle assembly. FIG. 15B is a right front perspective view of a cradle assembly and a page turner of the apparatus of the present invention. FIG. 16A is a front elevation view of a cradle assembly and a page turner, depicting the geometric relationships between components thereof. FIG. 19 is a left front perspective view of a cradle assembly and a page turner of the apparatus of the present invention, further showing three drive motors used to operate the page turner. These elevation and perspective views best depict the operation of the page turner of the present invention, and should be considered in combination for an understanding thereof.

Referring to FIGS. 15A and 15B, page turner 440 comprises vacuum head 442, upper arm 444, lower arm 446, pivot block assembly 448, pivot tube 450, vacuum head drive motor 452, upper arm drive motor 454, and lead screw 456. Vacuum head 442 further comprises outlet sleeve 458, which is sealed and rotatably engaged with vacuum tube 443. Hence vacuum head 442 is pivotably engaged with vacuum tube 443, as indicated by arcuate arrow 490. Vacuum tube 443, comprising a thin-wall hollow tube, is joined and sealed to upper arm 444. Upper arm 444 further comprises a thin-wall substantially rectangular or square hollow member, with a cap 445 sealably fitted to the cantilevered end of upper arm 444. Vacuum tube 443 further comprises at least one passageway at its junction within upper arm 444, such that the interior passageway within vacuum tube 443 is in communication with the interior passageway of upper arm 444.

Upper arm 444 is pivotably joined to lower arm 446 by pivot shaft 460, such that upper arm 444 is pivotable with respect to lower arm 446 as indicated by arcuate arrow 492. In further description within this specification, the angle between upper arm 444 and lower arm 446 is referred to as the rho ($\rho$) angle. Such rho angle is depicted in FIG. 16A.

Referring again to FIGS. 15A and 15B, lower arm 446 comprises a thin-wall hollow member as described for upper arm 444, with a cap (not shown) sealably fitted to its lower end, also as described and shown for upper arm 444. The ends of lower arm 446 and upper arm 444 proximate to each other and joined by pivot shaft 460, are enclosed within a flexible bellows sleeve (not shown), which is sealed to said ends of lower arm 446 and upper arm 444. Thus, said flexible bellows renders the internal passageway of lower arm 446 in communication with the internal passageway of upper arm 444.

Lower arm 446 is further joined and sealed to pivot tube 450, which further comprises a thin-wall hollow tube having at least one passageway at its junction within lower arm 446. Thus the interior passageway within pivot tube 450 is in communication with the interior passageway of lower arm 446. Pivot tube 450 is connected at its distal end to flexible tubing 464, which is further connected to vacuum valve 465 (shown schematically) and vacuum blower 467 (shown schematically). During the page turning process, vacuum blower 467 sucks air (or inert gas if such is present) from close proximity to leaf 39 into vacuum head 442, through vacuum tube 443, through upper arm 444 and adjoining bellows (not shown), through lower arm 446, through pivot tube 450, and out of the apparatus through flexible tubing 464.

Pivot block 448 comprises front bearing plate 466 and rear bearing plate 468, which house bearings 470 and 472, respectively. Pivot tube 450 is supported by bearings 470 and 472, and is therefore rotatably mounted within pivot block 448. Accordingly, lower arm 446, being joined to pivot tube 450, is pivotable about the central axis of pivot tube 450, as indicated by arcuate arrow 494.

In further description within this specification, the angle between lower arm 446 and the x-axis as previously defined in this specification and indicated in FIG. 16, is referred to as the theta ($\theta$) angle. Referring to FIG. 19, in operation of the apparatus during a page turning cycle, such pivotal motion is provided by motor 451. Drive pulley 453 is mounted on the shaft (not shown) of motor 451, and is operatively coupled by a pulley belt (not shown) with driven pulley 455, which is joined to pivot tube 450. Thus the rotation of motor 451 results in the variation of the theta angle, i.e. pivotal motion of lower arm 446, and all components attached thereto.

The pivotal motion of upper arm 444, relative to lower arm 446, is also motor driven in the present invention. Referring to FIGS. 15A and 15B, motor 454 is pivotably joined to pivot bracket 478, which in turn is joined to lower arm 446. Motor 454 is operatively joined to lead screw 456 by shaft coupling 480. Lead screw 456 is threadedly engaged with lead nut 482, which is pivotably joined to upper arm 444. Thus motor 454 rotates lead screw 456 as indicated by arcuate arrow 498, which drives pivotal motion of upper arm 444 and components attached thereto with respect to lower arm 446.

The operation of motor 454 controls the rho angle as defined previously in this specification and, shown in FIG. 16A. It will be understood that as motor 454 controls the rho angle, motor 454 also controls the value of R, also shown in FIG. 16A. R is defined as the distance between the axis of pivot tube 450 (see FIG. 15B) and the axis of vacuum tube 443 (see FIG. 15B). Noting that vacuum head 442 is operatively joined to vacuum tube 443, it will be understood that motor 451 (see FIG. 19) and motor 454 thus control the position of vacuum head, defined in polar coordinates and referenced to the axis of pivot tube 450. The theta (θ) angle, controlled by motor 451, defines the angular position of vacuum head 442 with respect to the axis of pivot tube 450. The value R, controlled by motor 454, defines the radial position of vacuum head 442 with respect to the axis of pivot tube 450.

Thus, by the operation of motors 451 and 454, vacuum head 442 is brought into close proximity to fluffed leaf 39 of book 10, depicted in FIG. 16A. However additional control of vacuum head is required. In order for vacuum head 442 to properly acquire fluffed leaf 39 from book 10, the lower portion 484 of vacuum head 442 must be aligned such that lower portion 484 of vacuum head 442 is substantially parallel with a portion of fluffed leaf 39. In the following description, the angle between lower portion 484 of vacuum head 442 and the x-axis is referred to as the phi (φ) angle. Such an angle is depicted in FIG. 16A, and is a measurement of the alignment of the lower portion 484 of vacuum head 442 with fluffed leaf 39 of book 10. It will be further appreciated that the angle at which the pivotable vacuum head is pivoted is variable (e.g., in accordance with the type of paper stock used for the page) and may be adjusted so as to assist in the separation of an acquired open page. In other words, the vacuum head, once the page is contacted, may be pivoted so as to force the acquired page or leaf away from underlying, adjacent pages and thereby assist in the separation of the pages.

In one embodiment, such alignment is provided by the use of an additional drive motor and linkage as depicted in FIGS. 16A and 19. Referring to FIGS. 16A and 19, motor 452 provides such aligning motion. Drive pulley 474 is mounted on the shaft (not shown) of motor 452, and is operatively coupled by a pulley belt (not shown with driven pulley 476, which is rotatably mounted on the lower end of lower arm 446. Link 447 is joined to drive pulley 474, and is therefore pivotable with respect to the lower end of lower arm 446. Linkage rod 449 is joined at its lower end to link 447, and at its upper end to link 462, which is pivotably mounted upon pivot shaft 460. In like manner, linkage rod 457 is joined at a first end to link 462, and to link 459, which is joined to vacuum tube 443.

It will be understood therefore, that the forward and reverse motion of motor 452 will produce the motion of link 447, indicated by arcuate arrow 491; which produces the motion of linkage rod 449 indicated by arrow 493; which in turn produces the motion of link 462 indicated by arcuate arrow 495; which in turn produces the motion of linkage rod 457 indicated by arrow 496; which in turn produces the motion of link 459 indicated by arcuate arrow 497; which in turn produces the pivotable motion of vacuum head 442 indicated by arcuate arrow 490. Thus the operation of motor 452 controls the phi (φ) angle, and accordingly, the alignment of the lower portion 484 of vacuum head 442 with fluffed leaf 39 of book 10.

Figure 21:
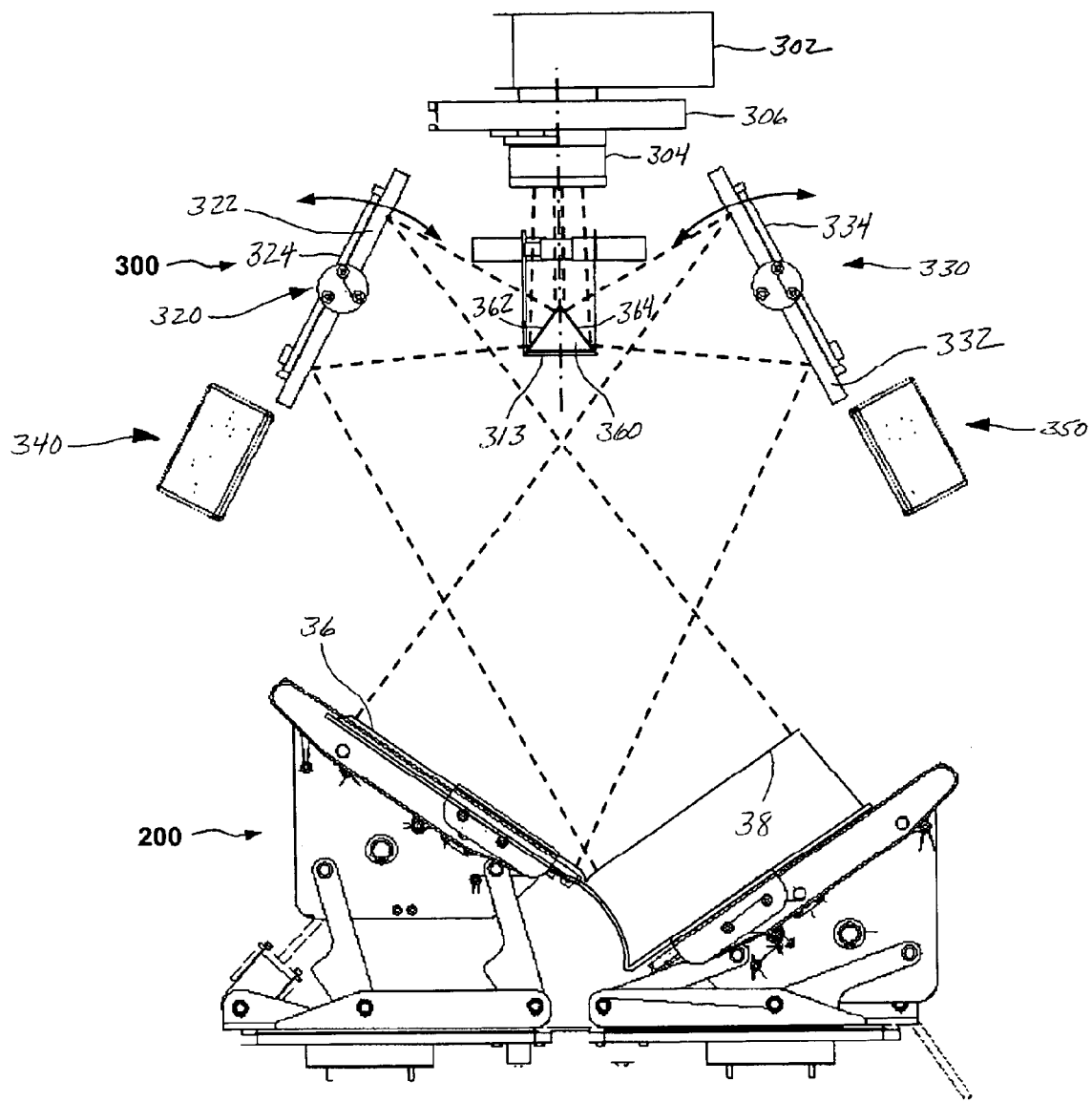
FIG. 21 is an elevation view of an alternative optical assembly of the apparatus of the present invention.

In the execution of a page turning cycle, which follows an imaging cycle, motors 451 and 454 are operated to control the angular and radial positions of the vacuum head 442, and motor 452 is operated to control the alignment of lower portion 484 of vacuum head 442, such that the lower portion 484 of vacuum head 442 is brought into close proximity with fluffed leaf 39 of book 10, as depicted in FIG. 21. The effect of gas flowing into vacuum head 442 through the interstice between vacuum head 442 and fluffed leaf 39 results in fluffed leaf 39 being drawn upwardly to the lower portion 484 of vacuum head 442. Fluffed leaf 39 is temporarily, gently acquired against the lower portion 484 of vacuum head 442 by the pressure differential between the ambient atmosphere present, and the vacuum within the interior of vacuum head 442.

Vacuum head 442 may be a vacuum head having a corrugated surface, which enables such vacuum head to more effectively acquire fluffed leaf 39. Such vacuum heads, also known as adaptive air plenums, are well known in the art. For example, U.S. Pat. No. 6,398,206 B1 of Taylor et al., issued Jun. 4, 2002, discloses a sheet feeding apparatus having an air plenum with a corrugated surface, comprising a first set of ribs at a first height and a second set of ribs at a second height, which corrugates and separates a top paper sheet from a stack of paper sheets therebelow. U.S. Pat. No. 6,398,208 B1 of Taylor et al, also issued Jun. 4, 2002, discloses a sheet feeding apparatus having an air plenum with a corrugated surface and with a leaky perimeter seal, which corrugates and separates a top paper sheet from a stack of paper sheets and seals thereto. The disclosures of each of these United States patents are hereby incorporated herein by reference.

Additional aspects of the present invention are directed to the application of a vacuum head having a corrugated surface as an aid to the separation and turning of pages in an open-book scanner. Scanners of the type in which the present application find a particular use are described, for example, in the following patents U.S. Pat. No. 6,056,258, U.S. Pat. No. 5,640,252 and U.S. Pat. No. 5,359,207. The disclosures of each of these United States patents are hereby incorporated herein by reference.

After vacuum head 442 has acquired fluffed leaf 39, motors 451, 452, and 454 are operated to effect the turning of a page. Motors 451 and 454 control the angular and radial positions of the vacuum head 442 such that a substantially arcuate trajectory of vacuum head 442 results, as indicated by arcuate arrow 499. As such arcuate trajectory occurs, motor 452 is operated such that the lower portion 484 of vacuum head 442 is maintained substantially parallel with fluffed leaf 39, as it is being turned. In this manner, the page turning operation does not put the page being turned into a highly curved configuration. Such a high degree of curvature would produce bending stresses in the page, possibly damaging the page, or causing the page to become detached from vacuum head 442. Instead, the page is maintained in a substantially planar configuration, or with an involute profile, as it is turned, such that minimal bending or tensile stress is produced in the page as it is turned, i.e. substantially pivotally moved about its bound edge.

Referring to FIG. 16A, and by way of further illustration, the operation of motor 452 during page turning is described qualitatively in terms of phi angle. At the commencement of page turning, when vacuum head 442 has acquired fluffed leaf 39, the phi angle of vacuum head 442 is approximately 30 degrees in the embodiment depicted in FIG. 16A. At the halfway point of page turning (not shown), i.e. when the turning leaf is substantially vertical, the phi angle of vacuum head 442 is approximately 90 degrees. Accordingly, lower portion 484 of vacuum head 442 is substantially vertical. Nearing the completion of page turning (not shown), the turned leaf is nearing the angle of the former verso page 36 of book 10. The phi angle of vacuum head 442 at this point in the cycle is approximately 130 degrees. In other words, vacuum head 442 "rolls over" during the turning of a page, such that the lower portion 484 of vacuum head 442 faces diagonally downward at the beginning of page turning as depicted in FIG. 16A, to being substantially vertical at the halfway point of page turning, to facing diagonally upward near the completion of page turning.

Referring to FIG. 15B, when page turning is nearly complete and vacuum head 442 is proximate to the former verso page 36, vacuum valve 465 is closed, resulting in the release of leaf 39 from vacuum head 442. Vacuum head is moved further out beyond the field of view of the camera (not shown), wherein the page turning cycle is complete and the next imaging cycle can begin. It will be appreciated that in a typical cycle, the vacuum is kept on as the page is turned, allowing the clamps to come down and hold the pages in position as the vacuum head completes its cycle. Furthermore, a vacuum sensor may be employed to sense when, after turning the page, the vacuum head begins to loose contact with the page and to confirm that it is okay for the clamps to begin to move into clamping position. In this sense, the vacuum sensor may be used as a sensor to determine if the page has been turned appropriately. However, there may arise situations where the vacuum sensor cannot be used to initiate the clamping, such as loose pages or torn pages of a bound document, where the vacuum would not be broken when the vacuum head 442 moves upward. In these situations the vacuum is preferably turned off so as to avoid moving a loose page out and/or eliminating further tearing of a partially torn page.

In the operation of page turner 440, proximity sensors 484, 485, 486, and 487 enable the setting of the zero positions of motors 451, 452, and 454 at the beginning of a book imaging process. In this manner, the variation in book sizes (i.e. width and thickness) is accommodated.

To summarize, page turner 440 of the present invention replicates substantially the same page motions in turning a page as performed by a human reader.

In another embodiment, the page turning assembly may further comprise an air knife, which is used to fully separate the top fluffed leaf from any additional leaves that may have been displaced from the text block by the fluffer. Such air knives are known in the art of sheet feeding of paper sheets in electrophotographic copiers and printers. Refer, for example, to U.S. Pat. No. 6,279,896 of Linder et al., the disclosure of which is incorporated herein by reference.

Figure 16B:
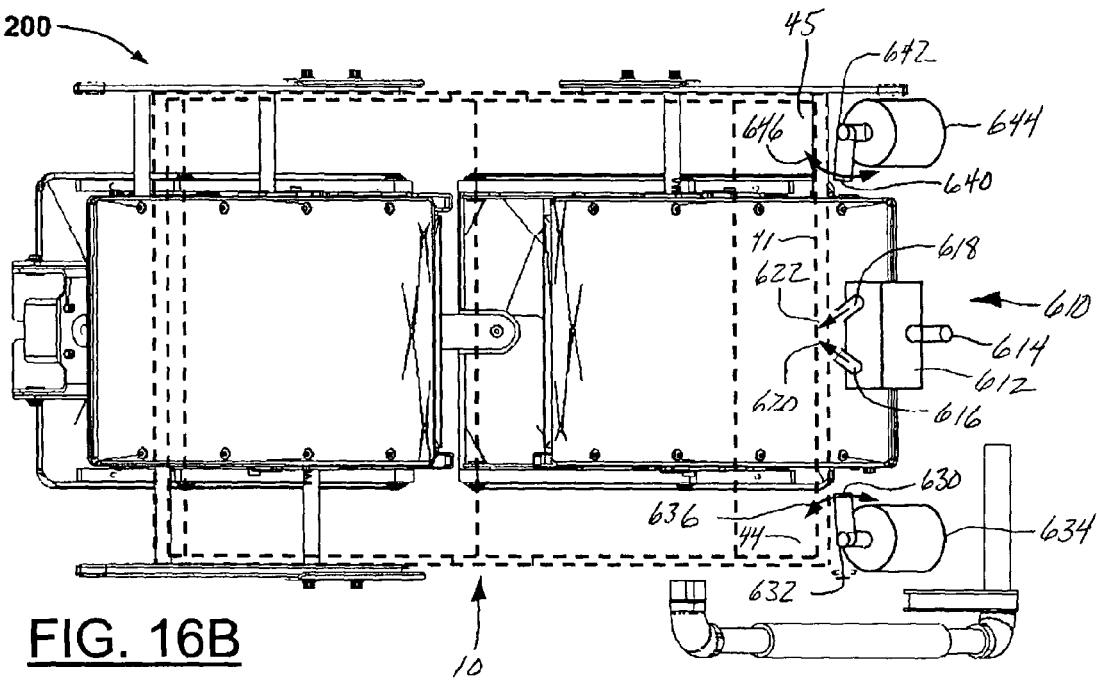
FIG. 16B is a top view of the cradle assembly and page turning assembly of FIG. 16A, wherein the page turning assembly further comprises retard fingers for ensuring that only a single page is turned by the page turning assembly.

FIGS. 16A and 16B depict one embodiment of a page turning assembly of the present invention, further comprising an air knife. Referring to FIG. 16A, air knife 610 comprises a plenum chamber 612, an inlet port 614, and at least one nozzle 616 directed toward the outer edge of fluffed leaf 39. Air knife 610 is suitably mounted upon an additional supporting structure (not shown) of the apparatus. Pressurized air is supplied to the inlet port 614 of air knife 610, and passes through the plenum 612, and out of nozzle 616. Nozzle 616 is preferably directed at an angle with respect to text block 30 of book 10, as depicted in FIG. 16A, in order to most effectively separate additional fluffed leaves (not shown) from top fluffed leaf 39 of book 10.

Pressurized air is preferably provided to air knife 610 by a blower (not shown). In one embodiment (not shown), a manifold is provided, and the blower 423 of FIG. 14B is operatively connected by tubing and fittings to air knife 610, such that blower 423 supplies air to fluffer 410 of FIG. 14B, and to air knife 610 if FIG. 16B.

In one preferred embodiment shown in FIG. 16B, air knife 610 comprises a pair of nozzles 616 and 618, disposed at approximately a 45 degree angle to the outer edge 41 of fluffed leaf 39. The air streams of nozzles 616 and 618, indicated by arrows 620 and 622 respectively, converge in proximity to outer edge 41 of fluffed leaf 39, and more effectively separate additional fluffed leaves (not shown) from top fluffed leaf 39 of book 10. Thus, in the embodiments described, the page turning apparatus uses an air knife to separate a top page from adjacent pages, thereby preventing or avoiding the turning of multiple pages at one once.

In yet a further embodiment, the page turning assembly of the present invention further comprises retard fingers (see e.g., FIG. 13C), which are used to block or retard the movement of any additional leaves that may have been displaced from the text block by the fluffer, during the page turning cycle. It is known that at high page turning speed and short cycle times, when a page is turned rapidly, it creates a vacuum, which draws on the next leaf, or several leaves, in sequence. If such leaf has been separated sufficiently by the fluffer, this induced vacuum may cause this next leaf to be turned, as well as the intended leaf. If such a scenario occurs, the effect in image acquisition of book pages is to skip at least one pair of pages, which is clearly undesirable. Accordingly, retard fingers are used to prevent such an undesired operation.

FIG. 16B depicts one preferred embodiment of retard fingers. Referring to FIG. 16B, retard fingers 630 and 640 are disposed at the corners 44 and 45, respectively, of book 10. Retard finger 630 is operatively joined to shaft 632 of motor 634. In like manner, retard finger 640 is operatively joined to shaft 642 of motor 644. Motors 634 and 644 are suitably mounted on additional supporting structure (not shown) of the apparatus. Operation of motor 634 in the counterclockwise direction will deploy retard finger 630, and operation of motor 634 in the clockwise direction will retract retard finger 630, as indicated by arcuate arrow 636. In like manner, operation of motor 644 in the clockwise direction will deploy retard finger 640, and operation of motor 644 in the counterclockwise direction will retract retard finger 640, as indicated by arcuate arrow 646. In the execution of the page turning cycle, retard fingers 630 and 640 are deployed immediately prior to the operation of the page turner 440 of FIG. 16A, the operation of which has been previously described.

In another embodiment, the present invention further comprises page edge detection means. A variety of known devices are suitable as page edge detection means. In functional terms, any optical, mechanical, or electrical device, or combination thereof, which can detect the discontinuity between air and the edge of a piece of paper is suitable. In one embodiment, page edge detection means comprises and optical device, with one preferred embodiment comprising a phototransistor array. One suitable phototransistor array is manufactured by Optek Technology, Inc. of Carrollton, Tex., and sold as Type OPR5013. This Optek phototransistor array comprises a multi element light emitting diode array having approximately thirteen elements, with 0.027 inch resolution per element.

Figure 20:
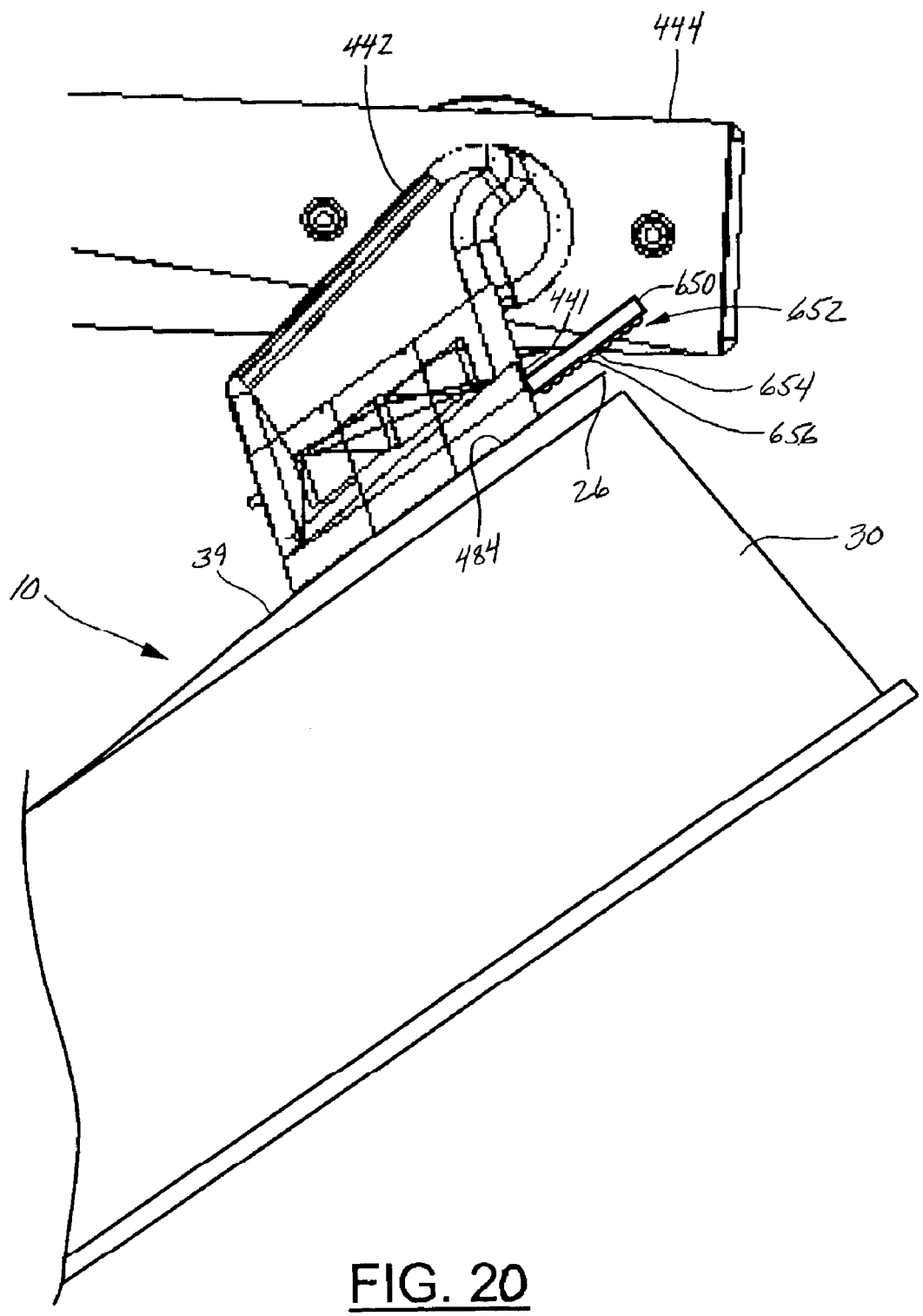
FIG. 20 is a side elevation view of a vacuum head further comprising page edge detection means attached thereto.

In one embodiment depicted in FIG. 20, the phototransistor array is mounted upon the vacuum head so that it can be verified that the page being turned remains attached to the vacuum head during the entire page turning cycle. Referring to FIG. 20, phototransistor array 650 is suitably mounted upon surface 441 of vacuum head 442. Phototransistor array 650 is mounted such that it protrudes outwardly from surface 441 in a direction such that the array of individual elements 652 is substantially parallel to lower portion 484 of vacuum head 442. Accordingly, phototransistor array elements 652 are substantially parallel to fluffed leaf 39 of book 10.

Phototransistor array 650 further comprises photodetection means (not shown) for each element 652 of phototransistor array 650. Such photodetection means are well known and are provided, e.g., in the phototransistor array of Optek Technology previously described. Thus, if the edge of a substantially light reflecting surface is placed in proximity to phototransistor array 650, a signal may be provided from each element 652 and corresponding photodetection means to indicate if the light reflecting surface is proximate to each individual element 652. Thus the location of the edge of a light reflecting surface may be determined to a level of precision approximately equal to the distance between the individual elements 652.

Such is the basis for the use of a phototransistor as page edge detection means. Referring to FIG. 20, the fore-edge 26 of fluffed leaf 39 is determined by phototransistor array 650 to be located between element 654 and element 656. Element 656 and adjacent elements towards vacuum head 442 detect the presence of fluffed leaf 39, and elements 654 and adjacent elements away from vacuum head 442 detect the absence of fluffed leaf 39.

Such page edge detection means are useful in detecting the edge of the fluffed leaf 39 prior to and during the page turning cycle. In this manner, the acquisition and retention of the fluffed leaf 39 by the vacuum head 442 may be confirmed throughout the page acquisition and page turning cycle. The use of page edge detection is particularly valuable when imaging a book that is significantly prone to page foreshortening over the course of imaging the book pages seriatim, as previously described herein. Such page edge detection significantly improves the capability of the apparatus of the present invention to accommodate books of varying geometry and spine properties.

Figure 5:
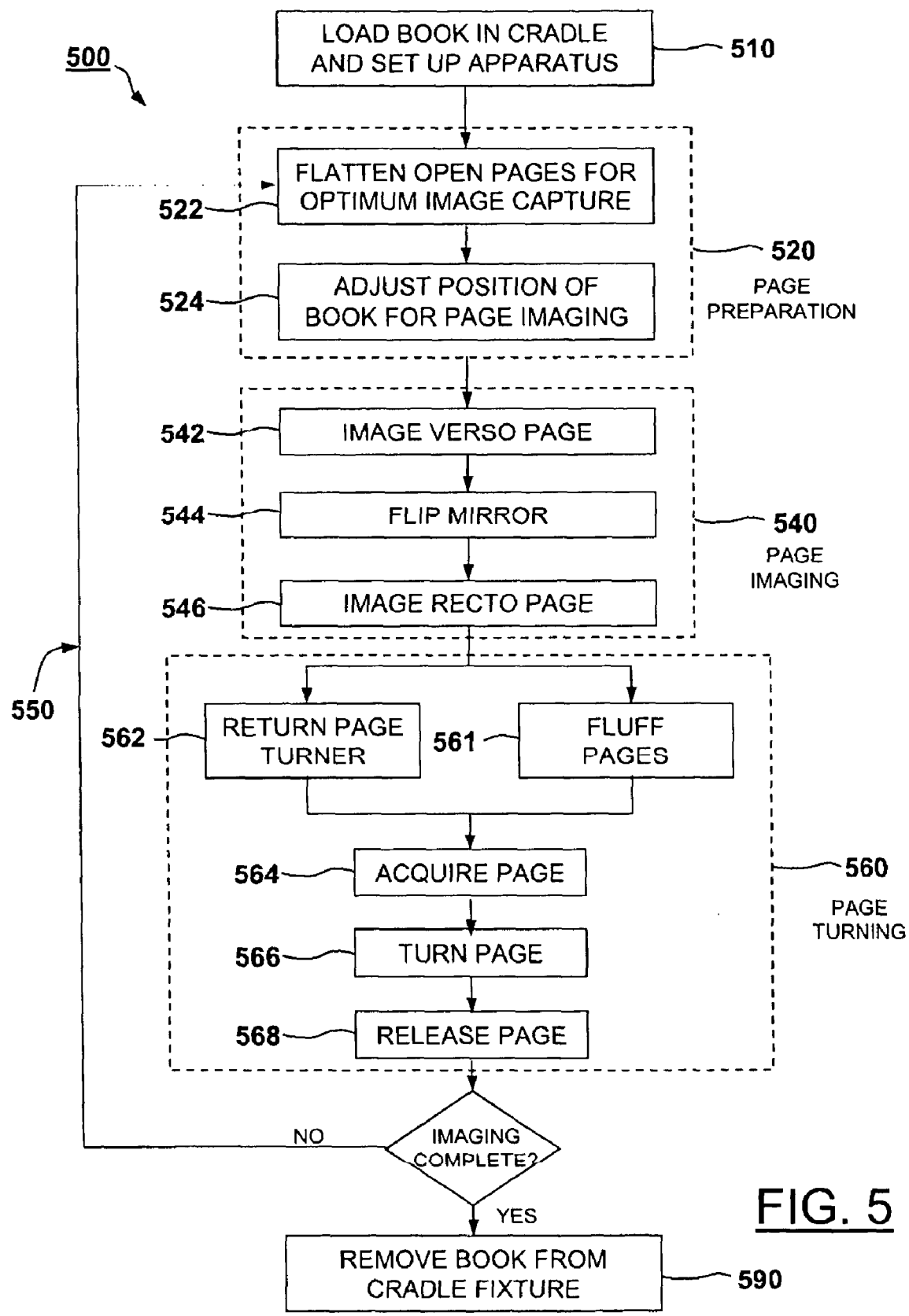
FIG. 5 is a flow chart of an automated process for acquiring images of the pages of a book, using embodiments of the present invention.

The overall operation of the apparatus wherein images of the pages of a book are recorded is now described. FIG. 5 is a flow chart of an automated process for acquiring images of the pages of a book, using embodiments of the present invention. Referring to FIG. 5, process 500 begins with step 510, the loading of a book and setup of the apparatus, and ends with step 590, the removal of the book from the cradle of the apparatus. Steps 510 and 590 are manual steps performed by an operator. Step 510 comprises placing the book upon the cradle and affixing slidable clamps to the edges of the book (previously described in this specification). Step 510 further comprises initial adjustments and optimization of sensors, optical and mechanical components, imaging software algorithms, etc., in order to accommodate the particular height, width, and thickness of the book, and to obtain clear, complete, and focused images of the pages throughout the imaging process. Step 590, the removal of the book, comprises the releasing of the slidable clamps of the cradle from the edges of the book, and lifting the book from the cradle.

Between steps 510 and 590 of the process 500, there occurs an overall repetitive cycle 550, which further comprises the sequential cycles of page preparation 520, page imaging 540, and page turning 560. Overall repetitive cycle 550 occurs until the final page of the book has been imaged.

Page preparation cycle 520 comprises page flattening step 522 and page position adjustment step 524. Page flattening step 522 is performed by the deployment of front page clamping assembly 140 and rear page clamping assembly 160 of FIGS. 9A through 11B, as previously described in this specification. Page position adjustment step 524 is performed by the operation of cradle drive motors 220 and 270 to independently adjust the positions of left cradle half 210 and right cradle half 260 as previously described in this specification.

Page imaging cycle 540 comprises verso page imaging step 542, mirror flipping step 544, and recto page imaging step 546. Verso page imaging, flip mirror operation, and recto page imaging are performed as previously described in this specification and shown of FIGS. 12A and 12B.

Page turning cycle 540 comprises page fluffing step 561 performed concurrently with page turner return step 562, page acquisition step 564, page turning step 566, and page releasing step 568. Page fluffing step 561 is performed by the operation of page fluffer 410 of FIGS. 13A through 14B, as previously described in this specification. Page turner return step 562 is performed by operating drive motors 452 and 454 of page turner 440 of FIGS. 15A and 15B, as previously described in this specification, in order to return vacuum head 442 from a position above and to the left of book 10 (where it was parked after the previous page turning cycle), to a position in close proximity to fluffed leaf 39. Page acquisition step is performed by the operation of a vacuum pump and valve, which are suitably operably connected to vacuum head 442, such that fluffed leaf 39 is drawn and secured against vacuum head 442; and by operation of air knife 610 of FIGS. 16A and 16B, as previously described in this specification. Page turning step is performed by deploying retard fingers 630 and 640 of FIG. 16 by motors 634 and 644, respectively; and by operating drive motors 451, 452, and 454 of page turner 440 of FIGS. 15A and 15B, such that fluffed leaf 39 is turned from the right portion of the open book to the left portion of the open book, as previously described in this specification. Page releasing step 568 is performed by the closing of a vacuum valve, so that vacuum within vacuum head 442 is relieved, and the turned leaf is released, as previously described in this specification.

Upon completion of the page turning cycle, the apparatus determines whether or not all of the pages of the book have been imaged, and if not, repetitive cycle 550 is repeated. In one embodiment, the apparatus simply detects a fault in page acquisition and shuts down, awaiting operator intervention. (A fault will always occur in page acquisition when there are no additional pages to be acquired and imaged.)

Figure 17:
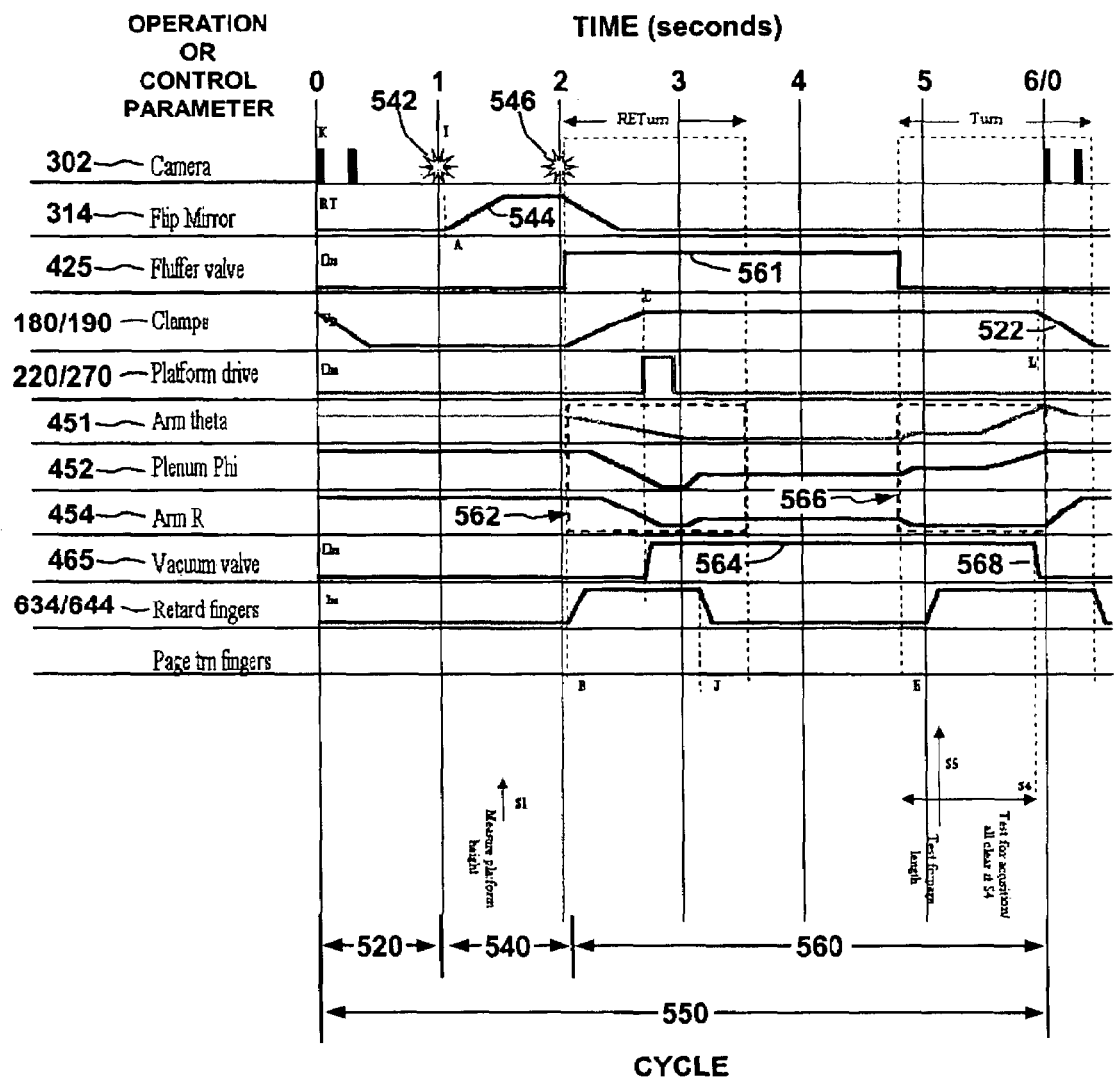
FIG. 17 is a timing diagram of the present invention, which depicts the parallel operations of the various assemblies during the book page imaging process.

In one embodiment of the present invention, repetitive cycle 550 takes approximately six seconds to complete, resulting in a page-imaging rate of approximately twenty pages per minute. Accordingly, a textbook of five hundred pages is imaged by the apparatus in approximately twenty five minutes. FIG. 17 is an exemplary timing diagram of the embodiment having approximately a six second repetitive cycle, which depicts the relative timing of the operation of key components of the apparatus during repetitive cycle 550. Referring to FIG. 17, repetitive cycle 550 occurs in approximately six seconds, and comprises page preparation cycle 520 occurring from zero to about 1.0 seconds, page imaging cycle 540 occurring from about 1.0 seconds to 2.1 seconds, and page turning cycle occurring from about 2.1 seconds to 6.0 seconds. In practice, the operation of the components performed to execute cycles 520, 540, and 560 may overlap slightly due to response times (e.g. acceleration and deceleration of motors) of components.

Referring again to FIG. 17, in page preparation cycle 520, "Clamps" operation occurs by the operation of page clamp motors 180 and 190, which deploy page clamp assemblies 140 and 160, as previously described in this specification and shown in FIGS. 9A through 11B. Deployment of page clamp assemblies 140 and 160 starts at time zero, and takes approximately 0.4 seconds. In page imaging cycle 540, camera 302 executes the verso page imaging step 542 at approximately 1.05 seconds, as indicated by the flash icon 542. Flip motor 314 executes mirror flipping step 544 between approximately 1.1 and 1.5 seconds. Subsequently, camera 302 executes the recto page imaging step 546 at approximately 2.05 seconds, as indicated by the flash icon 546. Flip motor 314 then reverses mirror flipping step 544 between approximately 2.1 and 2.5 seconds, returning flip mirror to the verso page imaging position.

A number of components are operated simultaneously to execute the steps comprising page turning cycle 560. Page clamp assemblies 140 and 160 are immediately retracted by the operation of page clamp motors 180 and 190, during the time of approximately 2.1 to 2.6 seconds. Fluffer valve 425 is actuated, executing page fluffing step 561 from the time of about 2.1 to 4.8 seconds. In an embodiment of the apparatus comprising an air knife (not shown), such air knife is operated as part of the execution of page fluffing step 561. Retard finger drive motors 634 and 644 deploy retard fingers 630 and 640 at approximately 2.2 seconds. Arm theta control drive motor 451, vacuum head plenum phi control drive motor 452, and arm R drive motor 454 begin operation at approximately 2.1, 2.3, and 2.4 seconds respectively, and operate until approximately 3.5 seconds, to execute return page turner step 562. Vacuum valve 465 is opened at approximately 2.6 seconds, drawing the fluffed leaf to the vacuum head and thereby executing page acquisition step 564. Arm theta control drive motor 451, vacuum head plenum phi control drive motor 452, and arm R drive motor 454 resume operation at approximately 4.8 seconds with vacuum valve 465 remaining open, and operate until approximately 5.9 seconds, to execute turn page turner step 566. At time of approximately 5.9 seconds, vacuum valve 465 is closed, executing the release page step. As the cycle begins again with page flattening step 520, theta control drive motor 452, and R drive motor continue operation for approximately 0.3 seconds, moving the page turner to the left of the book and out of the field of view of the camera, while retard finger motors 634 and 644 retract retard fingers 630 and 640. Repetitive cycle 550 continues if the final pages have not been imaged.

It is to be understood that the apparatus of the present invention provides significant advantages. In particular, the adjustable book securing components of the cradle assembly accommodate the dimensional variability from book-to-book. The independent adjustment of the position of each cradle half of the cradle assembly accommodates the variation in page location during the transition of open page location from the front of the book to the back of the book, as the pages are turned seriatim from the first page to the last page.

Thus, each pair of open pages of a book is presented to the page clamping and page imaging systems in the same three-dimensional location, enabling the apparatus to obtain a clear, complete, and focused image of each page, regardless of the location of the open pages within the book. Furthermore, each fluffed leaf is presented to the page turning assembly in exactly the same three-dimensional location, enabling the apparatus to reliably turn each page, regardless of the location of the open pages within the book. For each page preparation cycle 520, page imaging cycle 540, and page turning cycle 560, no in situ adjustment of various components is needed to accommodate book variation. Adjustments of the apparatus are made once as part of a setup procedure at the beginning of the book imaging process in step 510 of FIG. 5. Such capability of the apparatus enables the overall repetitive cycle 550 of FIG. 5 and 17 to be completed through the imaging of an entire book.

It is, therefore, apparent that there has been provided, in accordance with the present invention, a method and apparatus for the acquisition and recording of book page images seriatim, comprising a cradle assembly, an optical assembly, and a page turning assembly. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. An apparatus for turning pages of a document, comprising:
   a base for supporting the operative assemblies and components of the apparatus;
   a cradle assembly for supporting the document therein, said cradle assembly being attached to the base and including a first cradle half and a second cradle half, wherein each of the cradle halves further includes a cradle base joined to a book support plate by a linkage and a drive motor operatively coupled to the book support plate, such that operation of the drive motor displaces the book support plate in an arcuate manner relative to the cradle base; and wherein the support plates of the first and second cradle halves are joined by a flexible web of material; and
   a page turning assembly for moving the pages to be viewed in seriatim.

2. The apparatus of claim 1, wherein each cradle half further comprises at least one cover clamp.

3. The apparatus of claim 1, wherein the page turning assembly further comprises a pivotable and translatable vacuum head for attaching to an open page and turning the separated open page.

4. The apparatus of claim 3, wherein the pivotable vacuum head is pivoted once in contact with the open page so as to assist in the separation of the open page from a plurality of adjacent pages.

5. The apparatus of claim 4, wherein the angle at which the pivotable vacuum head is pivoted so as to assist in the separation of the open page is variable in accordance with the type of paper stock used for the page.

6. The apparatus of claim 3, wherein the page turning assembly further comprises a page fluffer for separating an open page from an adjacent page.

7. The apparatus of claim 1, wherein the page turning assembly further comprises an air knife to separate a top page from adjacent pages so as to avoid turning of multiple pages at one time.

8. The apparatus of claim 1, further comprising an optical assembly to permit viewing of open pages of the document.

9. The apparatus of claim 8, wherein the optical assembly further includes a camera suitable for acquiring an image of at least one open page of the document and a display, connected to receive an output of the camera, where the image may be viewed.

10. The apparatus of claim 1, further comprising an optical assembly including:
    a camera;
    lighting directed to illuminate open pages of the document; and
    sensing means to detect the location of the open pages of the document relative to a field of view and focal plane of the camera.

11. The apparatus of claim 10, wherein said sensing means to detect the location of the open pages of the document is further employed to indicate the boundary of at least one edge of a page and where a signal from said sensor is employed to automatically control cropping of an image produced by said camera.

12. The apparatus of claim 11, further comprising a controller for controlling the operation of the apparatus in accordance with preprogrammed instructions, and wherein said sensing means to detect the location of the open pages of the document is capable of sensing a material extending beyond a page edge, and signaling the controller in response to the sensing of the material, thereby causing the controller to alter an operational cycle of the apparatus.

13. The apparatus of claim 3, further comprising:
a controller for controlling the operation of the apparatus in accordance with pre-programmed instructions, and
sensing means to detect the location of the open pages, said sensing means sensing the opacity of the page acquired by the vacuum head and providing a signal indicating the opacity to the controller, wherein the controller determines if multiple pages have been acquired by the vacuum head as a function of the opacity signal.

14. The apparatus of claim 10, wherein the optical assembly further comprises at least one mirror, located in an optical path between an open page and the camera, to direct an image of the open page to the camera.

15. The apparatus of claim 1, further comprising an open page securing and flattening means, said page securing and flattening means including a first page clamp and a second page clamp, each clamp being retractable prior to page turning and deployable prior to page imaging.

16. The apparatus of claim 1, further comprising page position adjustment means, said page position adjustment means including at least one positioning means operatively joined to at least one half of the cradle assembly, wherein the operation of the positioning means translates the cradle assembly, and the document held therein.

17. The apparatus of claim 1, further comprising a plurality of converging air jets, positioned adjacent and above an open page so as to cause the page to remain in a fixed and flattened position when air is directed toward the page through said air jets.

18. An apparatus that enables acquisition of page images, comprising:
a base for supporting the operative assemblies and components of the apparatus;
a cradle assembly having a first cradle half and a second cradle half; and
a page turning assembly for presenting the pages to be imaged seriatim, said page turning assembly including a pivotable and translatable vacuum head for attaching to a page and turning the page;
wherein each of the cradle halves of the cradle assembly comprises a cradle base joined to a book support plate by a linkage, each cradle half further having a clamp, and a drive motor suitably operatively coupled to the book support plate, such that operation of the drive motor displaces the book support plate in an arcuate manner relative to the cradle base; and
wherein the support plates of the first and second cradle halves are joined by a flexible web of material.

19. The apparatus of claim 18, further comprising an optical assembly comprising at least one camera, lighting directed at the pages, sensing means to detect the location of the pages relative to the field of view and focal plane of the at least one camera, and at least one mirror to direct the images of a left open page and a right open page to the at least one camera during an imaging cycle.

20. The apparatus of claim 18, further comprising open page securing means having a first page clamp and a second page clamp, each clamp being retractable prior to page turning and deployable prior to page imaging.

21. The apparatus of claim 18, further comprising page position adjustment means further comprising at least one motor operatively joined to at least one half of the cradle assembly, in order to translate the cradle assembly and the pages held therein in a substantially horizontal direction.

22. The apparatus of claim 18, further comprising page bifurcation position adjustment means including optical sensing means for sensing the position of a bifurcation of pages held within the cradle assembly of the apparatus.

23. The apparatus of claim 18, further comprising page edge detection means further comprising optical sensing means for sensing the position of the edge of a page as it is acquired by a vacuum head and turned by a page turning assembly.

24. The apparatus of claim 18, wherein the page turning assembly further comprises a page fluffer for separating a page from adjacent pages.

25. A method of reading a document comprising securing the document in a cradle assembly having support plates, the document being opened to a selected first and second pages; adjusting the position of the document by displacing at least one support plate in an arcuate manner such that at least one of the first and second pages are entirely within the field of view of at least one image acquisition device; holding the at least one page in position for a period of time; displacing at least the outer edge of the second page from contact with subsequent adjacent pages; temporarily placing a vacuum head proximate to at least a portion of the surface of the second page; acquiring the second page with the vacuum head; turning the second page about its line of contact with the binding of the document until the printed surface of the second page is substantially congruent with the printed surface of the first page; and releasing the second page from the vacuum head.

26. The method of claim 25, further comprising the step of acquiring an image of the first page of the document.

27. The method of claim 26, further comprising the step of acquiring an image of the second page of the document.

28. A method of reading a document comprising:
securing the document in a cradle assembly having book support plates, the document being opened to selected first and second pages;
flattening at least one of the first and second pages of the document, securing at least one of the first and second pages of the document with at least one page clamping device such that said at least one page is within the field of view and focal plane of at least one image acquisition device;
adjusting the position of the document by displacing at least one book support plate in an arcuate manner such that at least one of the first and second pages are entirely within the field of view of at least one image acquisition device;
holding the at least one page in position for a period of time;
releasing the page clamping device;
displacing at least the outer edge of the second page from contact with subsequent adjacent pages;
temporarily placing a vacuum head proximate to at least a portion of the surface of the second page;
acquiring the second page with the vacuum head;
turning the second page about an edge thereof until the printed surface of the second page is substantially congruent with the printed surface of the first page; and
releasing the second page from the vacuum head.

29. The method of claim 28, further comprising the step of acquiring an image of the first page of the document.

30. The method of claim 28, further comprising the step of acquiring an image of the second page of the document.

31. A cradle apparatus for adjustably supporting a document as pages of the document are turned, comprising:
- a first cradle half and a second cradle half, wherein each of the cradle halves further include a cradle base joined to a book support plate by a linkage;
- a drive motor, operatively coupled to the book support plates, such that operation of the drive motor displaces the book support plates in an arcuate manner relative to the cradle base; and
- wherein the support plates of the first and second cradle halves are joined by a flexible web of material.

32. The apparatus of claim 31, further comprising an open page securing and flattening means, said page securing and flattening means including a first page clamp and a second page clamp, each clamp being retractable during turning of document pages.

33. The apparatus of claim 31, wherein each cradle half further comprises at least one book cover clamp.

34. The apparatus of claim 31, further comprising page position adjustment means, said page position adjustment means including at least one positioning motor operatively joined to at least one half of the cradle assembly, wherein the operation of the positioning motor translates the cradle assembly, and the document held therein, in a substantially horizontal direction.

35. The apparatus of claim 1, further comprising at least one apparatus for clamping pages of the supported document, comprising:
- a pivot block;
- a pull rod; and
- at least two spreaders, hingedly affixed to one another and compliantly coupled, with links, to the pull rod, wherein when the pull rod is displaced downwardly toward a page bifurcation, the spreaders are brought into contact against a verso page and a recto page on either side of the bifurcation and hold the verso and recto pages in position.

36. The apparatus of claim 35, where said clamping apparatus is movable between a deployed state and a retracted state, to permit the turning of pages of the document when in the retracted state.

37. The apparatus of claim 35, where said clamping apparatus is pivoted away from an operational position to permit a document to be placed into position for clamping.

* * * * *